United States Patent [19]

Rodgers et al.

[11] Patent Number: 5,517,657
[45] Date of Patent: May 14, 1996

[54] SEGMENT REGISTER FILE READ AND WRITE PIPELINE

[75] Inventors: Scott D. Rodgers, Hillsboro; Kamla P. Huck, Portland, both of Oreg.

[73] Assignee: Intel Corporation, Santa Clara, Calif.

[21] Appl. No.: 220,693

[22] Filed: Mar. 30, 1994

[51] Int. Cl.$^6$ ............................................. G06F 13/00
[52] U.S. Cl. ..................... 395/800; 364/231.8; 364/271; 364/260; 364/939.1; 364/DIG. 1; 395/496
[58] Field of Search .................. 395/800, 496, 395/497.04

[56] References Cited

U.S. PATENT DOCUMENTS

| | | | |
|---|---|---|---|
| 4,365,311 | 12/1982 | Fukunaga | 395/550 |
| 4,442,484 | 4/1984 | Childs | 395/425 |
| 4,811,215 | 3/1989 | Smith | 395/375 |
| 4,980,819 | 12/1990 | Cushing | 395/375 |
| 5,388,073 | 2/1995 | Usami | 365/230.03 |
| 5,442,757 | 8/1995 | McFarland | 395/800 |

OTHER PUBLICATIONS i486 Microprocessor Programmer's Reference Manual, Intel Corporation, Osborne McGraw, 1990, Chapters 4–6.
Val Popescu, et al. entitled, "The Metaflow Architecture," IEEE Micro, Jun. 1991, pp. 10–13, 63–73.
Author, Mike Johnson, entitled *Superscalar Microprocessor Design*, Advance Micro Devices, Prentice Hall Series in Innovative Technology, 1991, pp. 1–289.

Primary Examiner—Eric Coleman
Attorney, Agent, or Firm—Blakely, Sokoloff, Taylor & Zafman

[57] ABSTRACT

A mechanism and procedure for providing an efficient pipeline for reading and writing information to a multiple ported segment register file (SRF) in different pipestages. The present invention is operable, in one embodiment, within an address generation unit (AGU) of a processor and is implemented to write the SRF during a particular clock phase of a pipestage and to read to the SRF during another clock phase of another pipestage of the AGU pipeline of a pipelined processor. The read and write of different pipestages associated with separate instructions may occur within a same clock cycle. The write occurs before the read. By reading and writing to the AGU in alternate clock phases, the read and write operations of the SRF do not conflict even though they span different pipestages of the pipeline. Therefore, pipestages of the present invention are not in resource conflict over the SRF read and write operations which occur in a same clock cycle. Specifically, within the scope of the present invention, the SRF may be read during the low phase of a clock cycle while the SRF may be written during the high phase of a clock cycle for different instructions. Alternatively, the above phase relationships may be inverted.

52 Claims, 13 Drawing Sheets

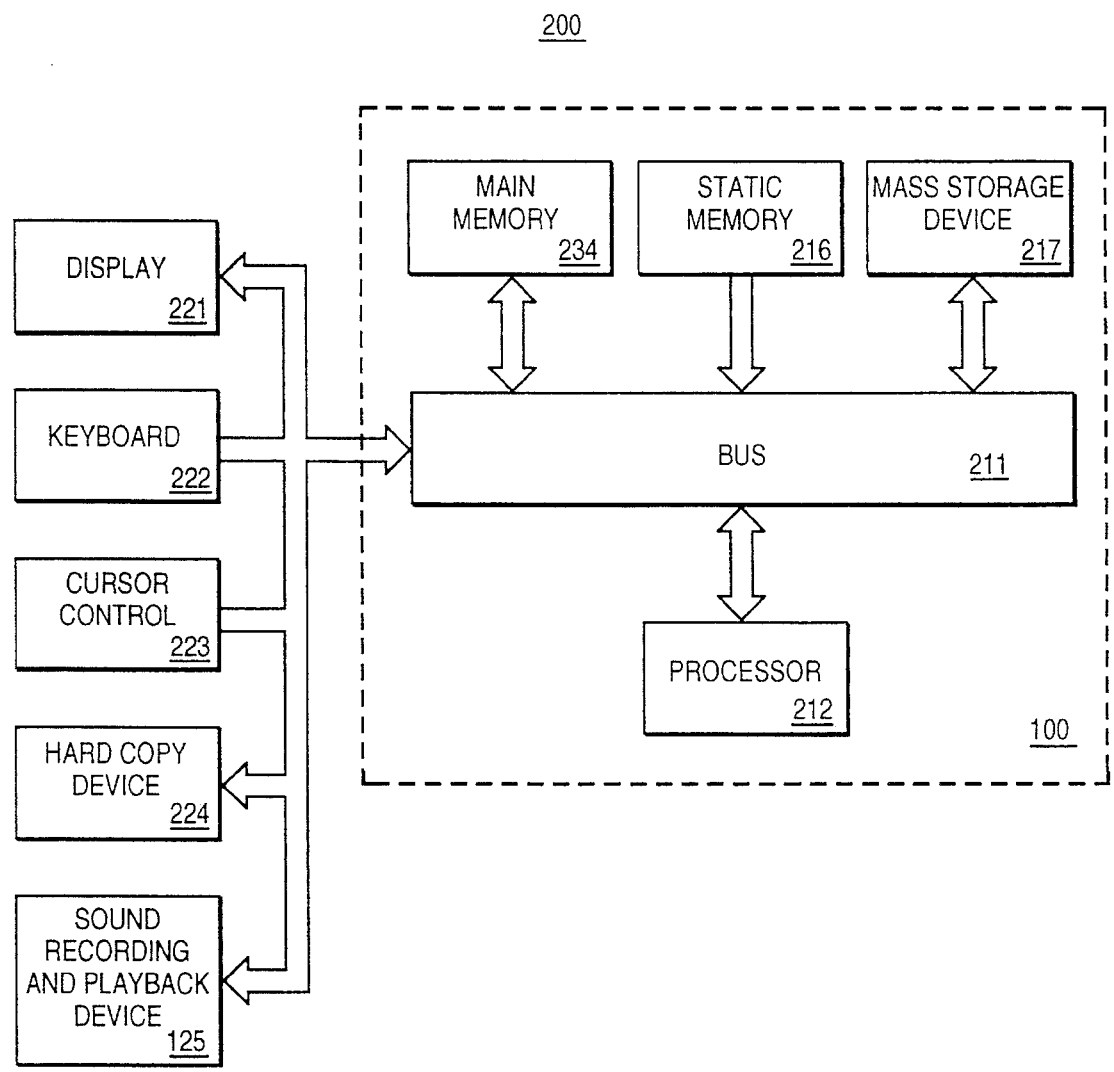
FIG_1

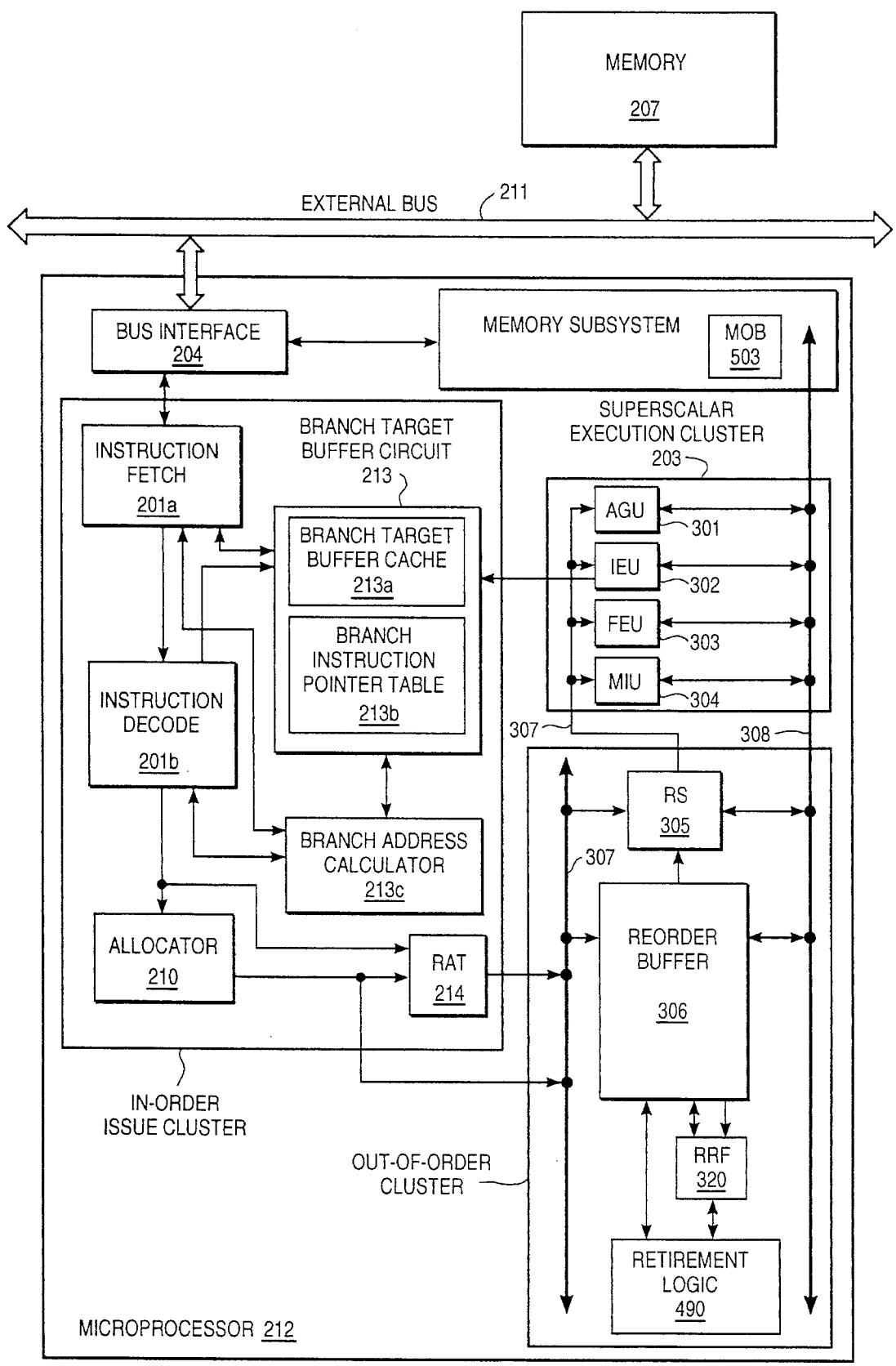
FIG_2A

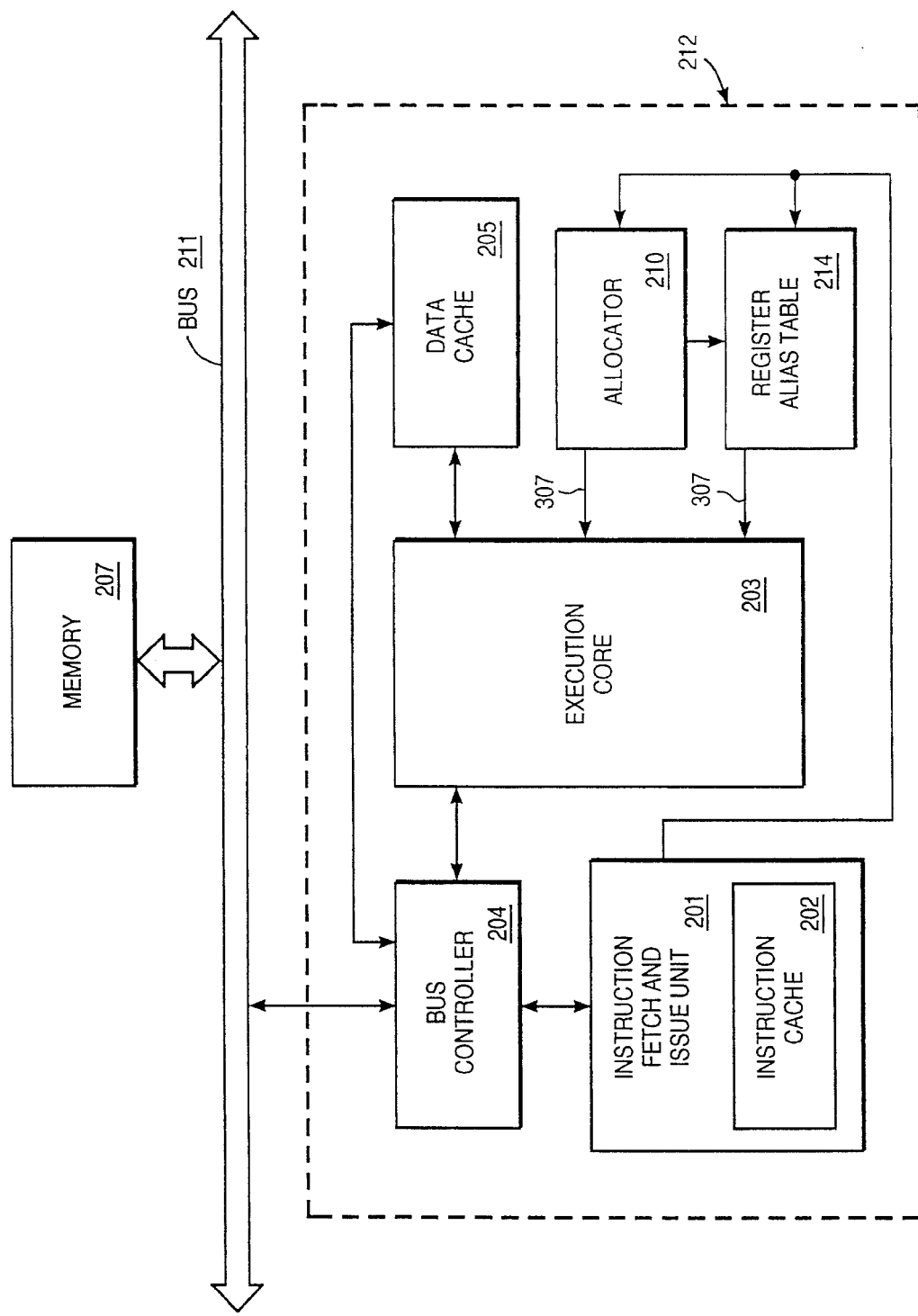

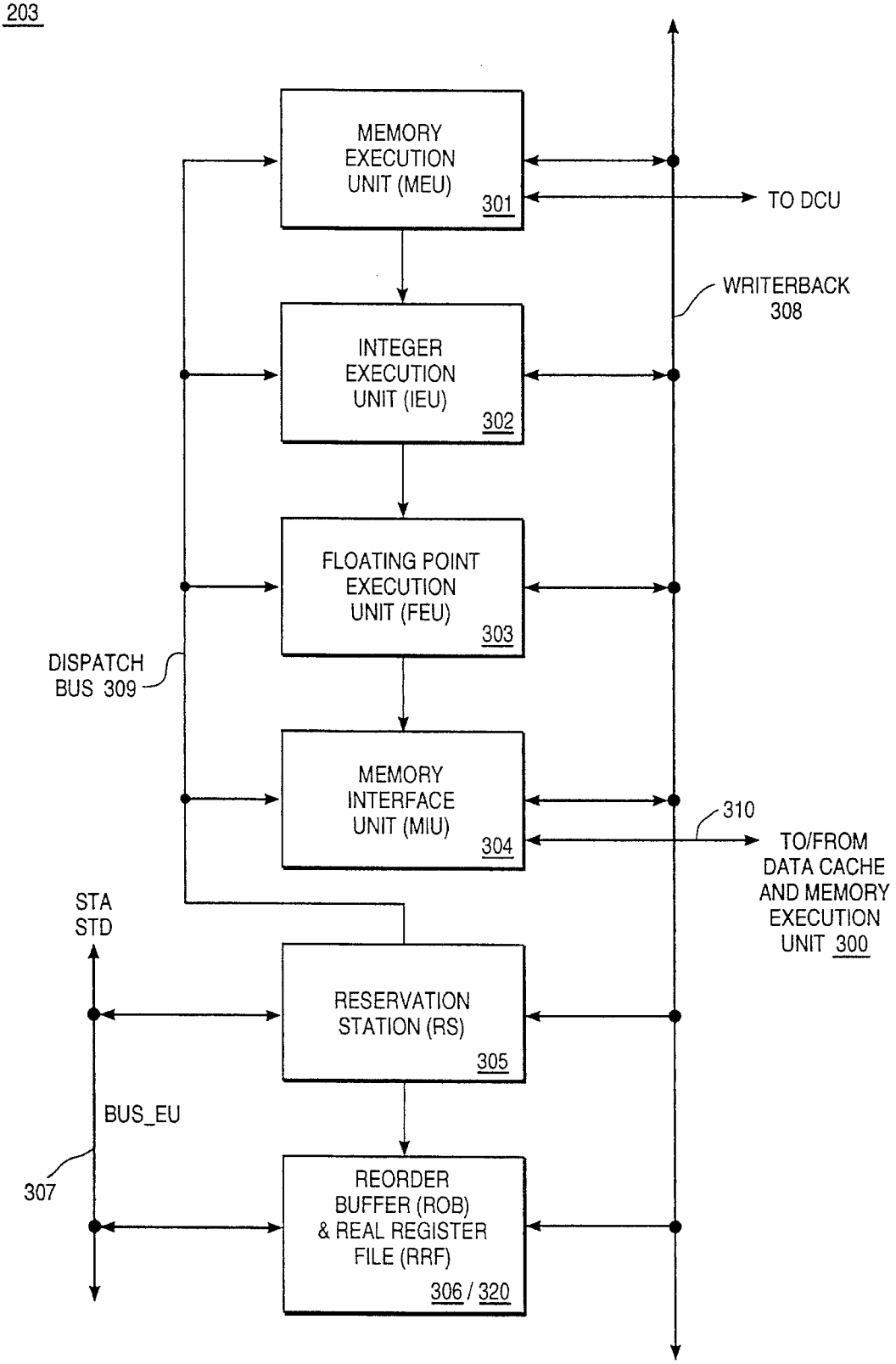
FIG_4

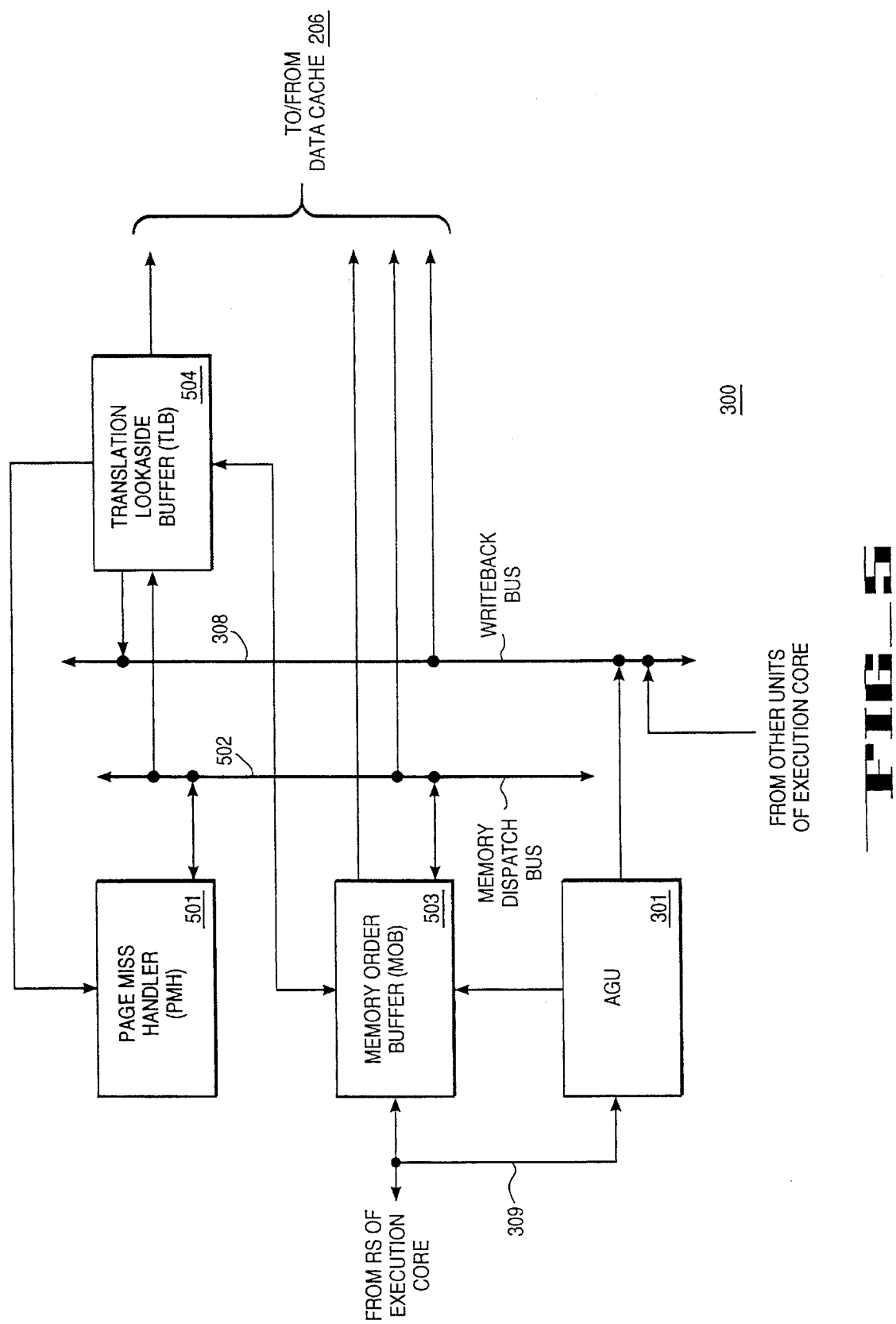

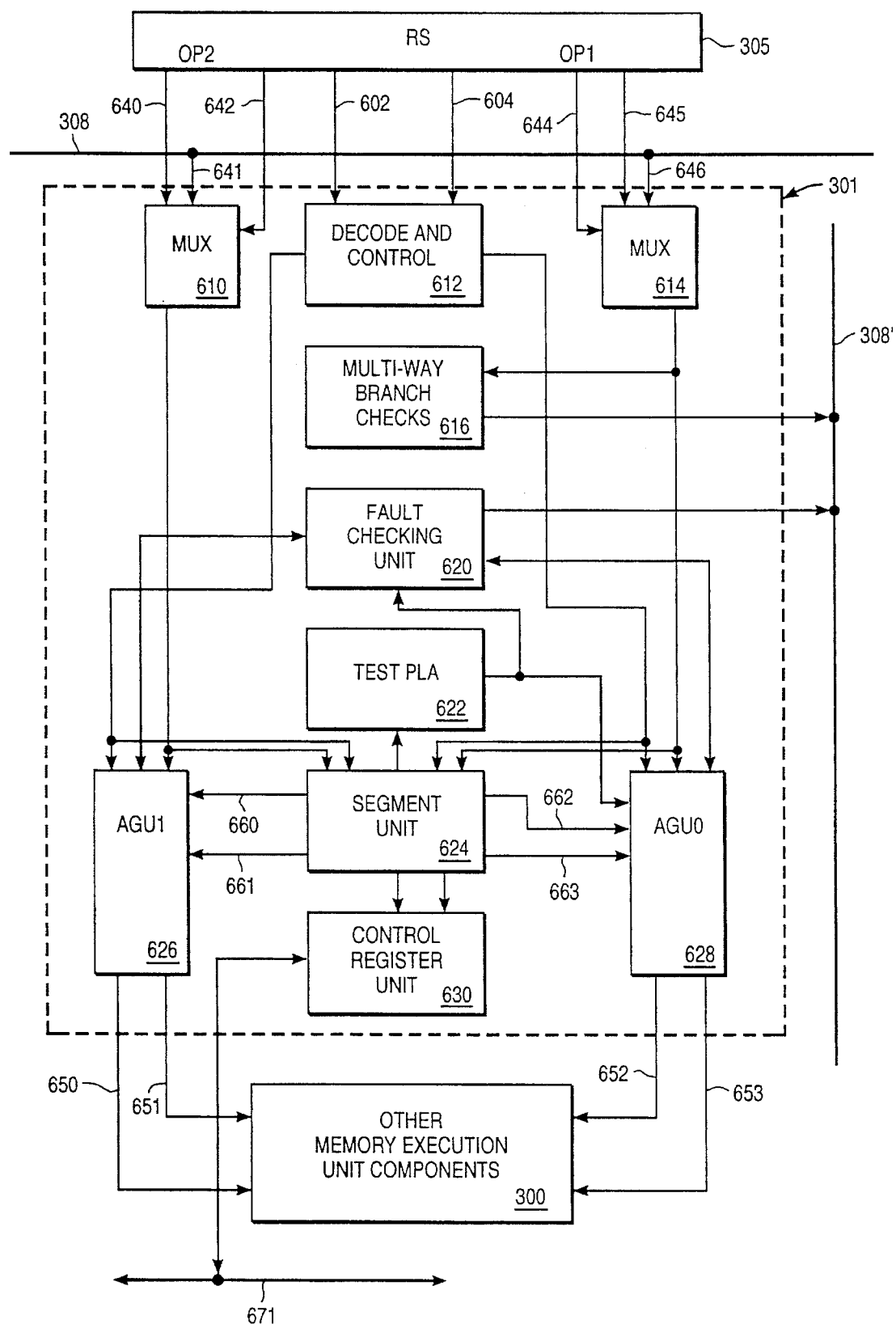
FIG_6

CLOCK CYCLE

| | 0 | 1 | 2 | 3 | 4 | 5 | 6 | 7 | 8 |
|---|---|---|---|---|---|---|---|---|---|
| μOP0 | 32 | 33 | 34 | 35 | | | | | |
| μOP1 | | 32 | 33 | 34 | 35 | | | | |
| μOP2 | | | 32 | 33 | 34 | 35 | | | |
| μOP3 | | | | 32 | 33 | 34 | 35 | | |

FIG_7

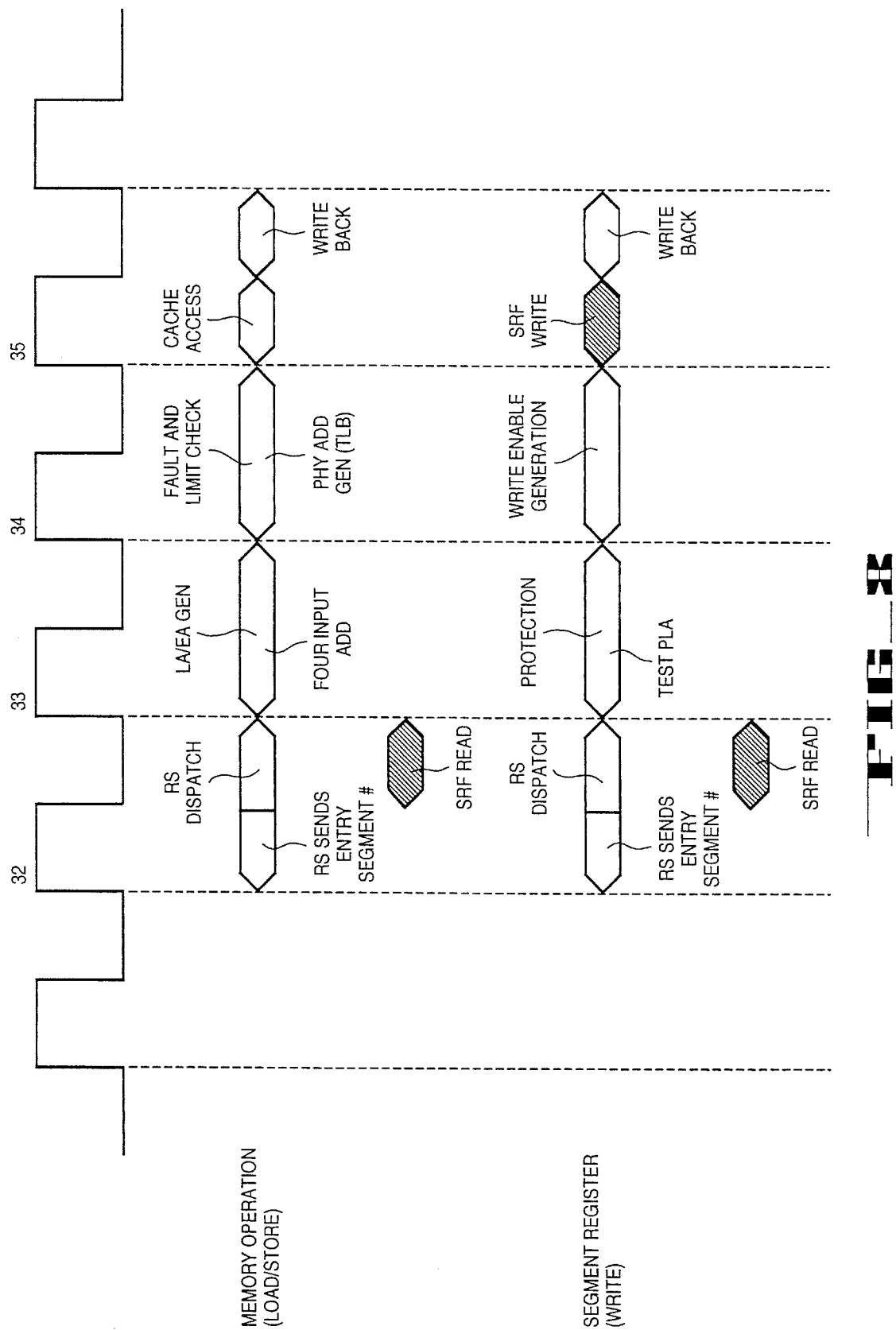

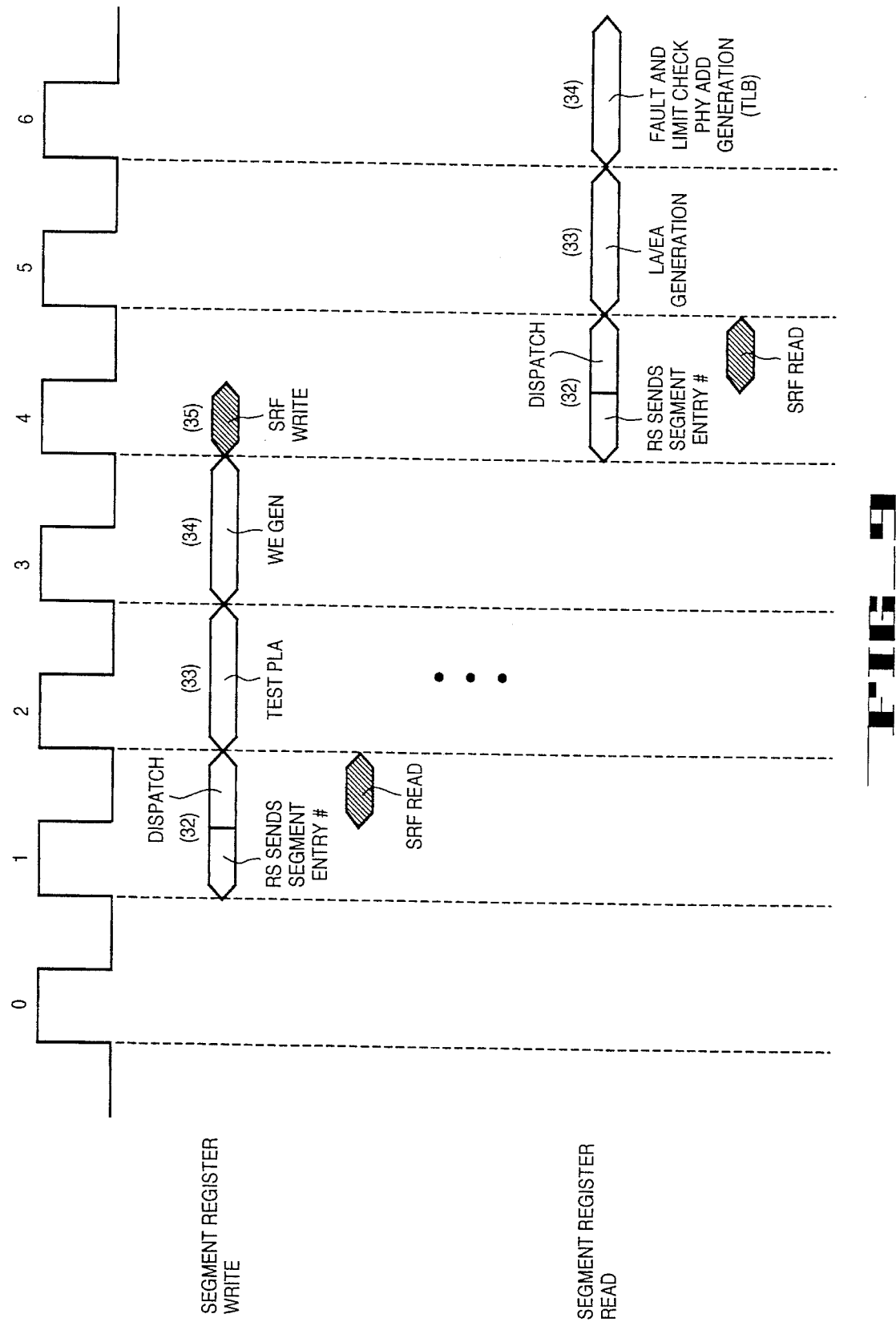
FIG_5

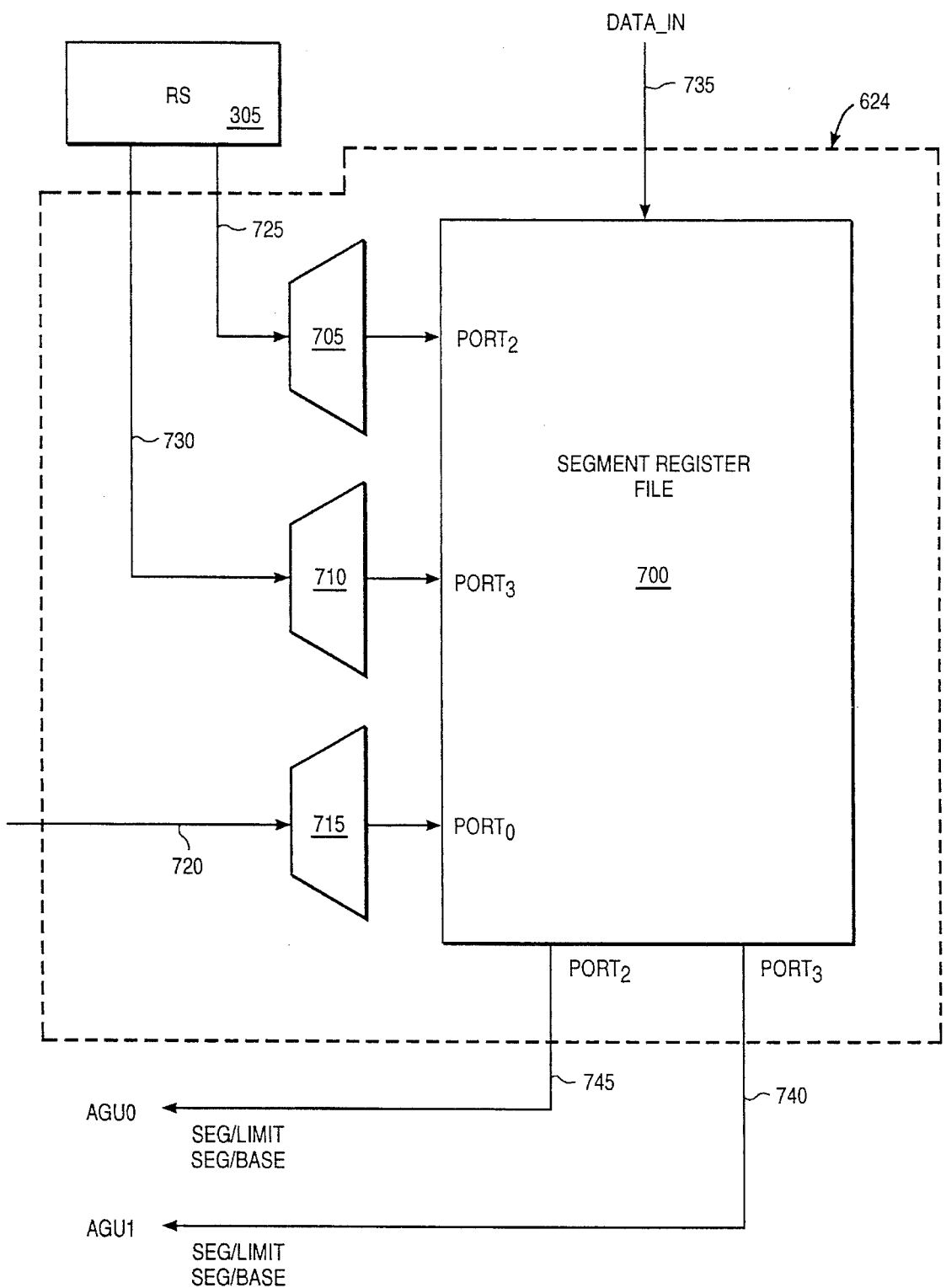
FIG_10

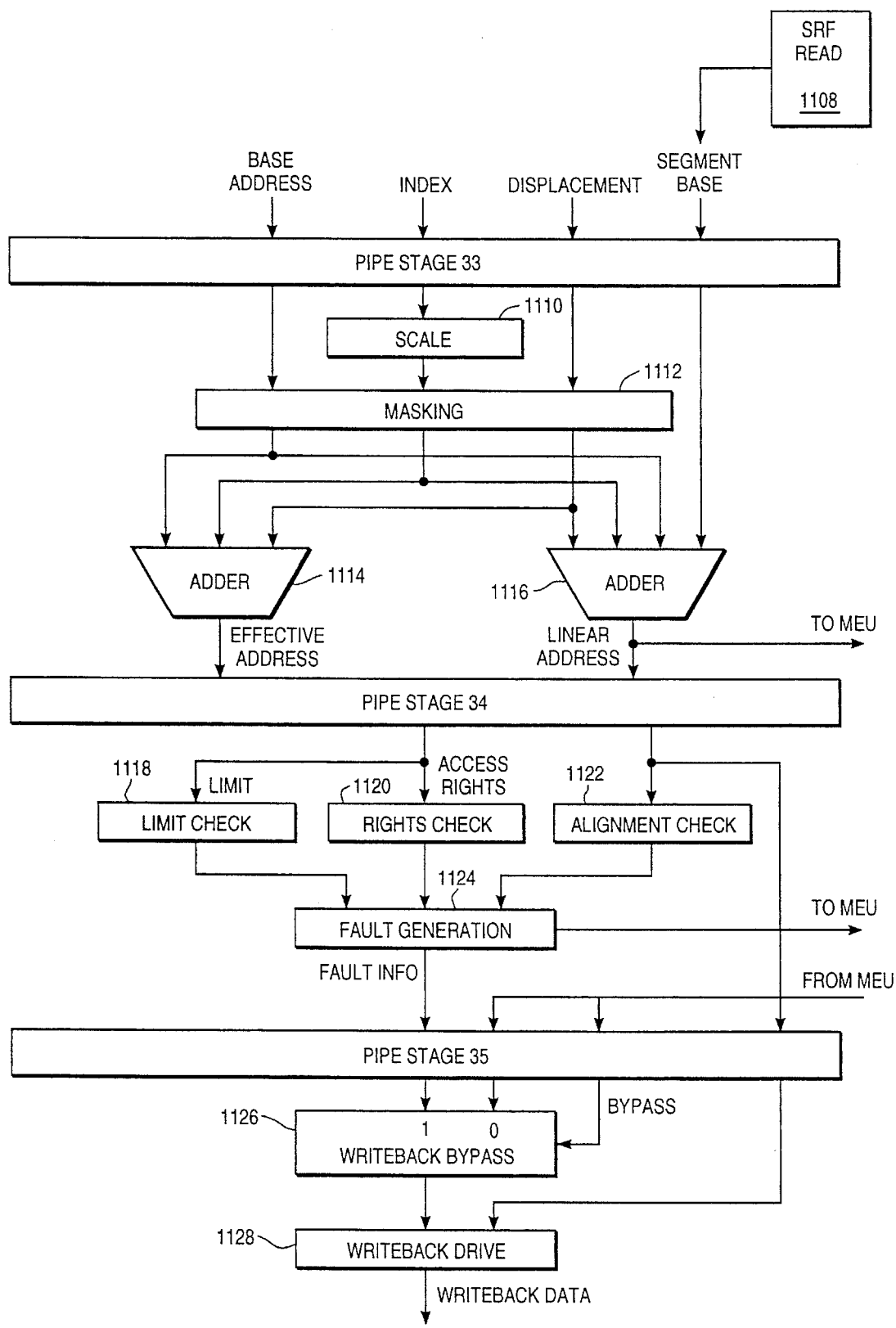
FIG_11A

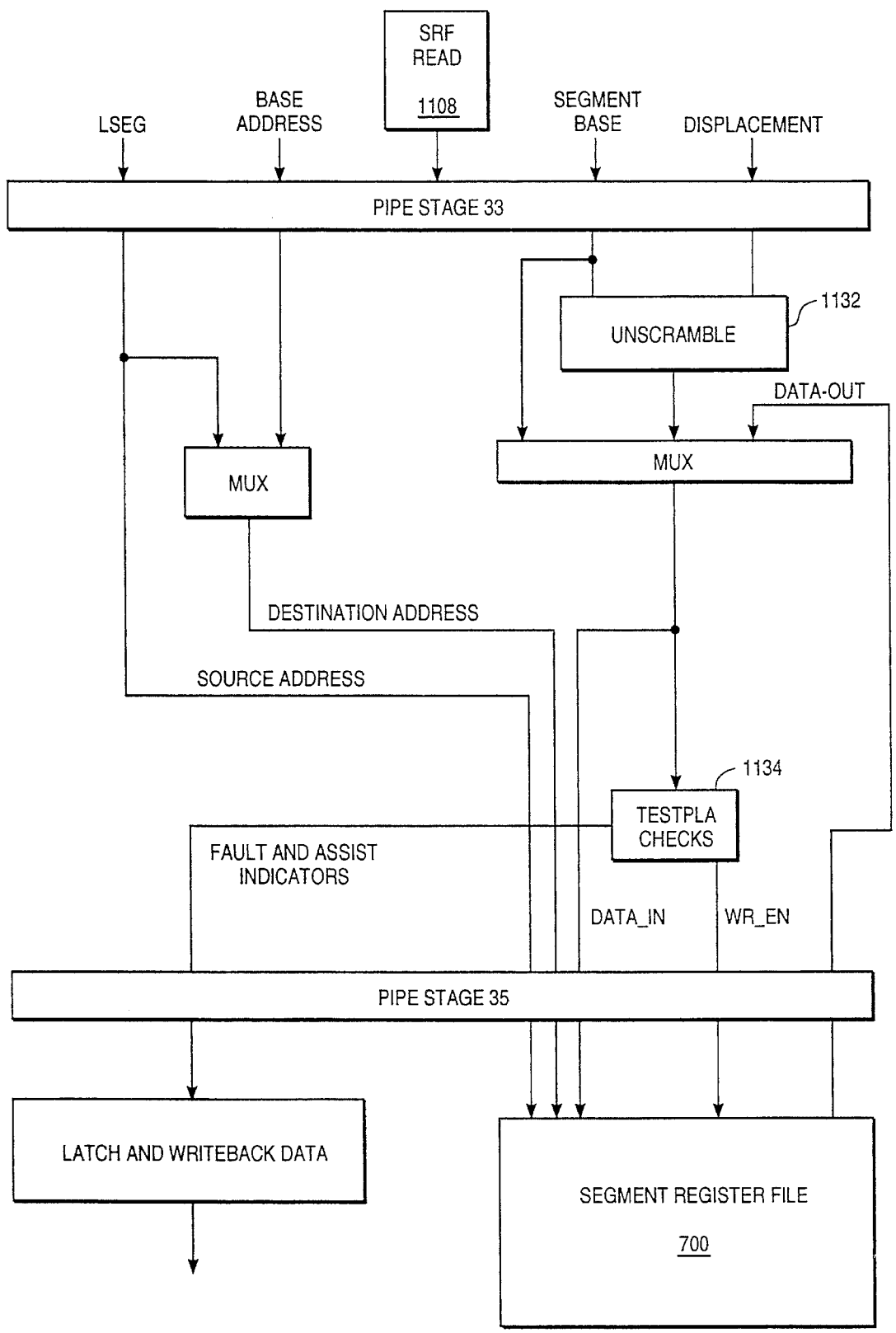
FIG_11B

SEGMENT REGISTER FILE READ AND WRITE PIPELINE

BACKGROUND OF THE INVENTION

1. Field of the Invention

The present invention relates to the field of information processors. More specifically, the present invention relates to devices and procedures for accessing a register buffer that maintains memory management information within a processor.

2. Prior Art

Modern computer systems utilize different techniques for addressing memory. Memory may be used for storing information or for storing program instructions for the computer systems. Often, the memory storage space is divided into segments and utilized by the computer system by indicating a particular segment. When a computer program changes a value stored in memory, it is perforating a "store" operation. And when the computer is retrieving an instruction or data from memory, it is performing a "load" operation. Each of these load and store operations require an address that specifies a location in memory. In a store operation, the address specifies a location in memory that is available for storing the data. In a load operation, the address specifies the location in memory where the desired instruction or data resides.

Typically, in a modem computer system, there are several different varieties of addressing reflecting different levels of abstraction and different protection levels. For example, in the Intel architecture processor, there are the logical, linear, and physical addresses. Further, memory may be divided into different segments with each segment managed differently. Segment information is stored in a special buffer or register file. Reference is made to the *i486 Microprocessor Programmer's Reference Manual*, from Intel Corporation, Osborne McGraw-Hill, 1990. Chapters 4–6 describe memory management and memory protection levels and the use of selector and descriptor information related to the segment register file.

The logical address is specified in the assembly language or machine code program, and consists of a selector and an offset. The offset is formed by adding together three components: base, scaled index and displacement. The logical address space is, therefore, segmented. The logical address (consisted of segment, offset) is transformed to a flat linear address by adding a segment base corresponding to the segment selector to obtain a linear address. Both the logical and linear address spaces may be larger than the amount of physical memory in a system. A technique called virtual memory is used to translate the linear address into a physical address used to address a limited amount of physical memory. The limited amount of physical memory is extended by secondary storage, such as a hard disk drive.

Addressing modes am motivated by several reasons. First sometimes addressing modes permit programs to be smaller (e.g., by reducing address size). Instead of placing a 32-bit logical offset constant in an instruction, they sometimes permit a smaller 1 byte specification of a register, for example. (Note that this is not always true) Second, addressing modes permit programs and subroutines to be written when the addresses of data are not known in advance. The address can be calculated from input and placed in a register. Third, addressing modes permit some frequent calculations to be encoded within the memory reference instruction, rather than requiring separate instructions.

As discussed, memory can be divided into one or more variable length segments, which can be swapped to disk or shared between programs. Memory can also be organized into one or more "pages". Segmentation and paging are complementary. Segmentation is useful to application programmers for organizing memory in logical modules, whereas pages are useful to the system programmer for managing the physical memory of a system. Typically, a segmentation unit is used to translate the logical address space into a 32-bit linear address space. A paging unit is then used to translate this linear address space into a physical address space. It is this physical address that appears on a processor's address pins.

The AGU of a processor manipulates a segment register file (SRF) which contains information related to segments used to access memory within a computer system. This information includes memory management and protection information. As discussed above, for information related to memory protection (limit checking, privilege levels, selector and descriptor table usage) reference is made to chapter 5 of the *i486 Microprocessor Programmer's Reference Manual*, from Intel Corporation, Osborne McGraw-Hill, 1990. Since many instructions involve a memory access of some type, the SRF is utilized many times by a typical processor. It would be advantageous to provide a mechanism allowing liberal access to the SRF without causing resource conflicts between pipelined instructions. Generally, it would be advantageous to provide an efficient mechanism for allowing an AGU to update a segment register file within a pipeline processor while simultaneously permitting reads of other segment registers. The present invention offers such new and advantageous functionality.

Accordingly, it is an object of the present invention to provide an efficient AGU within a processor. It is also an object of the present invention to provide a mechanism and procedure for efficiently reading and writing to a segment register file within a pipeline processor. It is another object of the present invention to provide an efficient pipeline format for use in reading and writing information to a segment register file within an AGU in order to reduce resource conflicts between pipelined instructions that need to read and write to the segment register file. It is also an object of the present invention to provide the above within a pipeline that allows segment register reads and writes to occur in different pipestages of the corresponding instructions. It is yet another object of the present invention to provide such efficient functionality within a processor that is superscalar. These and other objects of the present invention not specifically mentioned above will become clear upon discussions of the present invention hereinafter.

SUMMARY OF THE INVENTION

A mechanism and procedure for providing an efficient pipeline for reading and writing information to a multiple ported segment register file (SRF) in different pipestages is described. The present invention is operable, in one embodiment, within an address generation unit (AGU) of a processor and is implemented to write the SRF during a particular clock phase of a pipestage and to read the SRF during another clock phase of another pipestage of the AGU pipeline of a pipelined processor. The read and write of different pipestages associated with separate instructions may occur within the same clock cycle. The write occurs before the read. By reading and writing to the AGU in alternate clock phases, the read and write operations of the SRF do not conflict even though they span different pipestages of the pipeline. Therefore, pipestages of the present invention are not in resource conflict over the SRF read and write operations which occur in the same clock cycle. Specifically, within the scope of the present invention, the SRF may be read during the low phase of a clock cycle while the SRF may be written during the high phase of a clock cycle for different instructions. Alternatively, the above phase relationships may be inverted.

More specifically, embodiments of the present invention include, within an address generation unit of a processor, an apparatus for accessing information within a register file, said apparatus comprising: a segment register file for containing information pertaining to management of a memory, said memory accessed by a processor, said memory for storing instructions and data; logic for writing to said segment register file during a first phase of a clock signal, said clock signal for referencing pipestages of said processor; and logic for reading from said segment register file during a second phase of said clock signal wherein said first phase and said second phase are alternates. Embodiments of the present invention include the above and wherein said first phase precedes said second phase within a given cycle of said clock signal. Embodiments of the present invention include the above and wherein said logic for writing is operable during a first pipestage of a given instruction and wherein said logic for reading is operable during a second pipestage of said given instruction.

Embodiments of the present invention include the above and wherein said segment register file comprises: a first port for reading register information from said segment register file; a second port for reading register information from said segment register file; and a third port for writing register information to said segment register file and further comprising: a first address generation unit for reading and writing said segment register file, said first address generation unit coupled to receive information from said first port and coupled to supply information to said third port; and a second address generation unit for reading said segment register file, said second address generation unit coupled to receive information from said second port and wherein said logic for reading said segment register file is also for reading said segment register file during a processor dispatch pipestage wherein an associated instruction is dispatched.

The present invention also includes the above segment register file access mechanism implemented within a pipelined processor and also implemented within a computer system of the present invention. The present invention includes a method implemented in accordance with the above.

BRIEF DESCRIPTION OF THE DRAWINGS

FIG. 1 illustrates an exemplary computer system of the present invention.

FIG. 2A illustrates components of the processor implemented in accordance with the present invention;

FIG. 3 illustrates the execution core interface with components of the processor implemented in accordance with the present invention.

FIG. 4 illustrates components of the execution core of the present invention processor.

FIG. 5 an illustration of a memory subsystem of the processor of the present invention including the interfaces with the address generation unit.

FIG. 6 illustrates components of the address generation unit of the pipelined processor of the present invention.

FIG. 7 is a timing diagram illustrating pipelining of a number of exemplary instructions processed by an AGU of the present invention.

FIG. 8 illustrates the pipeline stages of the present invention for reading and writing to the segment register file of the present invention for a memory operation and for a segment operation.

FIG. 9 illustrates a timing restriction imposed by the present invention to insure segment register data coherency between SRF write and SRF read operations and illustrates SRF read and write within alternate phases of a same clock cycle.

FIG. 10 is a logical block diagram of the multiple ported SRF within the segment unit of the AGU of the present invention.

FIG. 11A illustrates data flow for a memory operation of the present invention.

FIG. 11B illustrates data flow for a segment register operation of the present invention.

DETAILED DESCRIPTION OF THE INVENTION

PART I—OVERVIEW

Figure 2B:
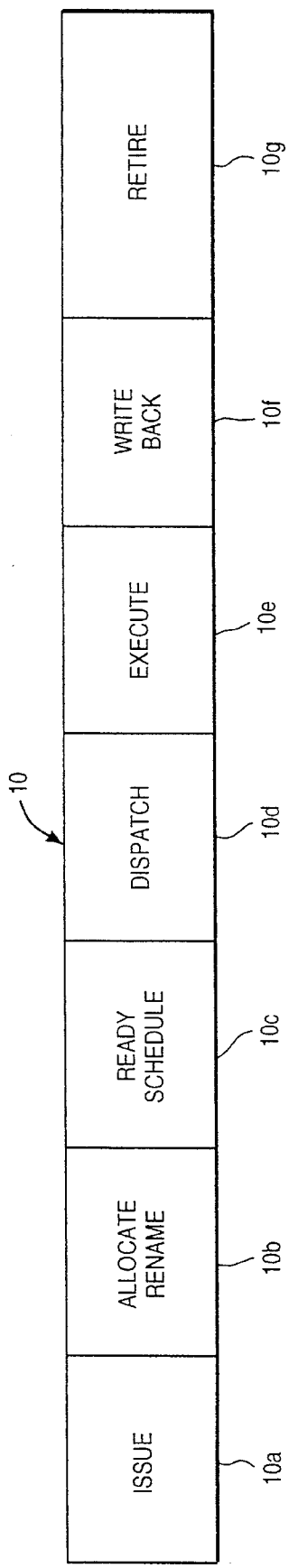
FIG. 2B illustrates an exemplary instruction pipeline for the pipelined processor of the present invention.

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention.

The present invention includes a mechanism and method for providing read and write operations to access a segment register file (SRF) in alternate clock phases of a clock signal in a pipelined processor to avoid resource conflicts between pipelined instructions. The SRF is located in an address generation unit (AGU) of the present invention. The segment register file may be read in one pipestage while written in another pipestage for a given instruction's pipeline within the present invention, however, resource conflicts are eliminated because the read and write of the SRF occur in different phases of the clock according to the present invention AGU. In prior art systems, it is advantageous to perform the read and write of the SRF within the same pipestage and thereby eliminate resource conflicts between pipelined instructions. However, in order to increase processing performance, and due to other demands, the SRF read and write of the present invention are not performed within the same pipestage of the instruction pipeline of the AGU of the present invention. However, by advantageously utilizing alternate clock phases for performing SRF reads and SRF writes, the present invention is able to eliminate resource conflicts while allowing the SRF read and write operations to occur in different pipestages of the instruction pipeline.

The structure, function, and operation of the AGU of the present invention to realize the above will be described hereinafter. However, it should be home in mind that the present invention also includes a computer system and pipelined processor implemented with the AGU of the present invention. Therefore, these systems and their interface with the present invention AGU, where pertinent to the present invention, are also discussed as needed. In advance of discussing aspects of the pipeline format of the present invention for reading and writing the segment register file in alternate clock phases, a discussion of the computer system and processor implemented within the scope of the present invention is presented first below.

PART II—HARDWARE ENVIRONMENT

Referring to FIG. 1, the computer system upon which a preferred embodiment of the present invention is implemented is shown as system 200. Computer system 200 comprises an external address/data bus or other communication mechanism 211 for communicating information within the system, and a processing mechanism 212 coupled with bus 211 for executing instructions and processing information. Processor 212 includes, but is not limited to microprocessors such as an Intel Architecture Microprocessor, manufactured by Intel Corporation of Santa Clara, Calif., processor 212 may also be based on another microprocessor architecture such as the PowerPC™, Alpha™, etc., and may be implemented using silicon or gallium arsenide. Processor 212 may be implemented on a single chip or within multiple chips. System 200 further comprises a random access memory (RAM) or other dynamic storage device 234 (referred to as main memory), coupled to bus 211 for storing information and instructions to be executed by processor 212. Main memory 234 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to an output display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 221. Another device which may be coupled to bus 211 is hard copy device 224 which may be used for printing instructions, data, or other information on a medium such as paper, film, or similar types of media. Furthermore, a sound recording and playback device 125, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

The present invention address generation unit (AGU) 301 (FIG. 2A), located within the MEU unit as will be discussed below, operates within environment of a superscalar, pipelined microprocessor 212 that speculatively executes instructions and further allows for out-of-order instruction execution. However, other microprocessors may be utilized consistent with the present invention as discussed above.

The processor of the present invention will be explained within the following discussions.

FIG. 2A illustrates a general block diagram of the processor 212 of the present invention. The components of the processor 212 are shown in FIG. 2A to provide the general structure and interface of the processor of the present invention. Generally, processor 212 is composed of an in-order portion and an out-of-order portion as shown. The in-order components process instructions in the program order of the instructions. The in-order cluster starts at instruction issue and continues until the register alias table 214 processes the instructions. The out-of-order cluster executes instructions out of their program order for maximum processing efficiency. After execution, the results of the instructions are placed into an architecturally invisible reorder buffer (ROB) 306 where they are then written into the architecturally visible register file (RRF) 320 according to their program code order at retirement. The process of updating the RRF 320 is called retirement. Only instructions that are part of a properly predicted program path and have been executed are eligible for retirement.

Processor 212 performs speculative execution. The in-order cluster of processor 212 performs branch prediction based on a history of branch outcomes. Until a branch is determined to be properly predicted, the instructions of that pathway are speculative. The ROB 306 also acts to contain this speculative information until instruction retirement. The branch target circuit 213, BTB cache 213a, branch instruction pointer 213b and the branch address calculator 213c perform speculative instruction execution by predicting program branch results to provide the pipeline with a steady source of instructions. The register alias table (RAT) 214 performs register renaming and is the last stage of the in-order pipeline. The RAT 214 renames the destination registers used by the instructions as they are issued (e.g., the logical destination registers) into registers of the ROB 306. By renaming the logical registers, the processor 212 is able to eliminate false data dependencies between separate instructions and thus increase its ability to process instructions in parallel. The RAT 214 maintains an array referenced by the logical register name of an issued instruction's source registers and outputs the most recently assigned ROB 306 register to that logical register. ROB 306 entries are assigned to the instructions in program code order by the RAT 214 to provide in-order retirement.

Renamed instructions are then passed to a reservation station (RS) 305 where they remain until their source data becomes valid (e.g., available for use by the execution units). When the source data becomes valid, the instructions of the reservation station 305 may be scheduled for execution and dispatched to an appropriate execution unit within the execution core 203 of the present invention processor. Multiple instructions may be executed in parallel by the execution core 203 of the present invention. The execution core 203 is described in further detail hereinafter. After execution, result information is placed onto the writeback bus 308 and the ROB 306 is updated. Instructions that read memory 207 and write memory 207 are called memory instructions or memory operations. Instructions that modify the SRF are called segment register operations. The AGU 301 of the present invention is an execution unit of the execution core. The AGU 301, as will be discussed, processes memory operations and segment register operations.

Instructions flowing from the out-of-order cluster retire to the real register file (RRF) 320 from the ROB 306 in program code order. The reservation station 305 and the reorder buffer 306 are illustrated. A load buffer and a store buffer are located in the memory order buffer 503 and are used by the load and store memory operations. An external bus 211, a writeback bus 308 and internal bus 307 are also illustrated. The pertinent parts of processor 212 as related to the AGU 301 are described in further detail hereinafter.

Refer to FIG. 2B which illustrates an exemplary and simplified overall pipeline format 10 of the present invention processor 212. Generally, the pipestages shown in FIG. 2B are exemplary only and may individually be composed of further pipestages as is apparent in other discussions herein. Aspects of pertinent parts of the pipestage format 10 directed at the present invention are discussed in more detail to follow, however, presented below is a summary of the overall pipeline format. The pipeline 10 begins at stage 10(*a*) where a group of instructions are issued by the issue components (204, 201A, 201B) of processor 212. In accordance with the present invention three or four instructions may be issued within pipestage 10(*a*).

At pipestage 10(*b*), the buffer resources (ROB 306, RS 305, load and store buffer) are allocated to the current group of issued instructions and register renaming occurs. Entries of the ROB 306 are sequentially allocated to the instructions in program code order. The instructions are then placed into allocated entries of the RS 305 where they remain pending execution. The in-order pipeline ends at pipestage 10(*b*). At pipestage 10(*c*), some instructions within the RS 305 that are pending execution are made ready and scheduled for execution if their source operand data is valid and an eligible execution unit is available. At pipestage 10(*d*), the scheduled instructions are dispatched from the RS 305 to appropriate execution units. As processor 212 is superscalar, multiple instructions may be dispatched to the execution units within pipestage 10(*d*). Memory operations and segment register operations are dispatched from the RS 305 to the AGU 301 of the present invention. At pipestage 10(*f*), the instructions are executed and written back to the appropriate entries of the ROB 306 and to RS 305 as source operand data for following instructions. To increase throughput, information written over the writeback bus may be directly routed back to the execution units (bypass) as source data for single cycle execution throughput. At stage pipestage 10(*g*), instructions of the ROB 306 that belong to a properly predicted program path are retired in program code order and allowed to update an architecturally visible register file 320 or allowed to update the external bus 211. The pipeline ends at pipestage 10(*g*), however, some instructions (such as store instructions) are actually performed after retirement because they are buffered in the store buffer and are not needed as source data for other instructions. A store operation is performed when it updates over the external bus 211.

It is appreciated that a number of different pipeline formats may be adopted within the scope of the present invention that may operate within a number of different types of processors. Specific levels of detail put forth herein should not be construed as a limiting factor in construing the scope of the present invention. For instance, as stated the present invention may operate within processors of the Power PC™ and DEC Alpha™ generations and is not limited to the Intel microprocessor architecture. As will be discussed in more detail below, the dispatch 10(*d*) and execution 10(*e*) pipestages are expanded to illustrate the advantageous pipeline mechanism of the present invention operable by the address generation unit (AGU) for segment register file accessing. These will be described as pipestages 32 through 35. During pipestage 32 a segment register file is read by the present invention for a given instruction during the low phase of the clock and during pipeline 35 the segment register file may be written during the high phase of the clock.

FIG. 3 is a block diagram of the memory subsystem interface of the processor 212 of the present invention. The memory subsystem comprises an instruction fetch and issue unit 201 with an integrated instruction cache 202, an execution core 203, a bus controller 204, a data cache memory 205, a memory unit 207, and an external bus 211. The memory unit 207 (RAM 234 and/or ROM 216) is coupled to the system bus 211. The bus controller 204 is coupled to the system bus 211. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. The instruction fetch and issue unit 201 of the processor 212, the execution core 203, the bus controller 204, and the data cache memory 205, together with the other general components of FIG. 3, comprise the processor 212. Elements 201–205 cooperate to fetch, issue, execute and save the execution results of instructions in a pipelined manner. The bus controller 204, the bus 211, and the memory 207 are also intended to represent a broad category of these elements found in most computer systems. Their functions and constitutions are well-known and therefore are not described further.

The instruction fetch and issue unit 201 fetches instructions from an external memory, such as memory unit 207, through the bus controller 204 via bus 211, or any other external bus. The fetched instructions are stored in instruction cache 202. The bus controller 204 manages transfers of data between external components and the processor 212. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetched and issued speculatively. The instruction fetch and issue unit 201 may fetch a multiple number of instructions (e.g., 1, 2, 3, or 4) within a common clock cycle. Instruction fetch and issue unit 201 is intended to represent a broad category of instruction fetching and issuing elements found in many computer systems. Their constitutions and functions are well-known and will be described only as necessary with reference to later figures.

The execution core 203 of the processor 212 includes an execution unit that holds and executes the integer and floating point instructions when the input data is valid from instructions including those that are speculatively fetched and issued. Similarly, the execution core 203 also includes a memory execution unit that holds, executes and dispatches load and store instructions to the data cache memory 205 (as well as external memory) as soon as their input data is valid from instructions including those that are speculative fetched and issued. The memory execution unit contains the address generation unit 301 of the present invention.

The data cache memory 205 of FIG. 3 responds to the load instructions immediately, forwarding data if necessary, whereas the store instructions are buffered. In other words, the instructions are not necessarily executed/forwarded in the order they were issued, and some instructions are speculatively executed/forwarded by processor 212. However, the execution results of the integer, floating point and load instructions are buffered, and then committed to processor state in program order by the reorder buffer. The buffered store instructions are committed to processor state in program order and then sent out for processing (execution) in the "background", at the convenience of the memory system. Speculative integer, floating point and load execution results and buffer stores of mispredicted branches are purged. Note that the speculative nature of fetched, issued and executed instructions is attributed to the uncertainty of whether a particular instruction or set of instructions is to be executed due to an non-affirmed branch prediction. The execution core 203 of the present invention, and the address generation unit therewithin will be described further in detail below.

The instruction fetch and issue unit 201 of FIG. 3 transfers the stream of instructions (uops) to a register alias table (RAT) 214 and an allocator 210. In one embodiment, the instruction fetch and issue unit 201 issues up to three (or four) in-order uops during each cycle of the processor. The allocator 210 assigns each incoming uop to a location (entry) in a reorder buffer (ROB) 306, thereby mapping the logical destination address (Ldst) of the uop to a corresponding physical destination address (Pdst) in the ROB 306. A register alias table (RAT) 214 maintains this mapping in a memory array. By renaming the registers used by the instructions to a larger set of physical registers that reside in the ROB 306, false data dependencies between instructions may be removed allowing additional parallel execution of instructions. The allocator also allocates entries to the load buffer and the store buffer sequentially, and the reservation station 305 is allocated nonsequentially due to the out of order nature in which instructions vacate the reservation station.

The contents of a ROB 306 register are retired to a location in a real register file (RRF) in program order. The RAT 214 thus also stores a real register file valid bit (RRFV) that indicates whether the value indicated by the logical address is to be found at the physical address in the ROB 306 or in the RRF after retirement. Based upon this mapping, the RAT 214 also associates every logical source address to a corresponding location in the ROB 306 or the RRF 320 (the source operand of one instruction generally must have been the destination of a previous instruction).

FIG. 4 is a block diagram of one embodiment of the execution core of the processor 212 of the present invention. Execution core 203 comprises a reservation station (RS) 305, a memory execution unit MEU 300, an integer execution unit (IEU) 302, a floating point execution unit (FEU) 303, a memory interface unit (MIU) 304, an architecturally invisible reorder buffer (ROB 306) and an architecturally visible real register file (RRF) 306. The MEU 300 contains the AGU 301 of the present invention. Additionally, execution core 203 includes an internal bus (Bus_EU) 307 and a writeback bus 308. The MEU 300 (including the AGU 301), IEU 302, FEU 303 and MIU 304 are all coupled to reservation station 305 via a dispatch bus 309 to receive instruction information for execution. They are also coupled to writeback bus 308 over which results are transmitted at the end of execution. The MIU 304 is also coupled to the data cache memory and MEU 300 via bus 310. The RS 305 is coupled to the writeback bus 308 and the Bus_EU 307. The RS 305 is also coupled to ROB 306 and RRF 320. ROB 306 and RRF are also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, multiple FEUs, such as two, and multiple MEUs as above. As will be discussed, the address generation unit of the present invention is operable within the MEU 300.

Reservation station 305 of FIG. 4 receives and stores information pertaining to the issued instructions that are pending execution and resolves their operands with data from the IEU 302, the FEU 303, the data cache memory, the ROB 306 and RRF 320 and holds them until their operands are all resolved. The RS 305 then dispatches the issued instructions to the AGU 301 (FIG. 5), the IEU 302, the FEU 303 and the MIU 304 and the MEU 300 as appropriate. The AGU 301 is part of the MEU 300. In particular, the load instruction is dispatched as a single operation, whereas the store instruction is dispatched as store address and store data operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

Each incoming uop is also assigned and written into an entry in the reservation station 305 by the allocator 210. The reservation station (RS 305) of FIG. 4 assembles the instructions awaiting execution by an appropriate execution unit, such as IEU 302 or memory execution unit (MEU) 300. The use of register renaming in the ROB 306 not only avoids register resource dependencies to permit out-of-order execution, but also plays a role in speculative execution since the architecturally invisible ROB 306 contains only speculative data. If a given instruction sequence is considered to be part of a predicted branch, then the execution of those instructions using the renamed registers in the ROB 306 has no effect on the actual registers denoted by instruction. Thus, if it is determined that the branch was mispredicted, the results calculated and stored in the ROB 306 may be erased and the pipeline flushed without affecting the actual registers found in the processor's architecturally visible register file (RRF). If the predicted branch affected the values in the RRF, then it would be difficult to recover from branch misprediction because it would be difficult to determine the values stored in the registers before the predicted branch was taken without the use of redundant registers in the ROB 306.

Referring to FIG. 4, after execution within one of the execution units, when a result is produced, it is written to the ROB 306 at an entry that was allocated to the instruction producing the result. The result may provide an input operand to one or more waiting instructions buffered in the reservation station 305, indicating that the source operand is ready for dispatch to one or more execution units along with the instructions using the operand. In the general case, instruction information that is held within the reservation station 305 will source the ROB 306 to obtain operand data and this information is forwarded to the appropriate execution units for execution when an instruction is scheduled and dispatched. When the checking logic of the processor 212 determines that a particular instruction is associated with a properly predicted branch, and all other conditions are satisfied, an instruction that has been executed and placed into the ROB 306 may retire. The associated physical register (Pdst) of that retiring instruction is then written into the RRF and becomes architecturally visible according to the original program code order. ROB 306 entries retire in order and thus the ROB 306 is sequentially allocated. The RS 305 is nonsequentially allocated because instructions within the RS 305 may be dispatched out of order.

The MEU 300, the IEU 302, FEU 303, and the MIU 304 in turn perform their operations accordingly to generate result data. The execution results of the integer, floating point and load instructions are held in the reorder buffer (ROB) 306, and then committed by RRF in the order these instructions were issued. Speculative execution results of the mispredicted branches are not committed, but instead are held in the ROB 306 and deallocated upon their retirement.

FIG. 5 depicts a block diagram of the relevant portions of one embodiment of the memory execution unit (MEU) of the present invention. The MEU 300 includes the AGU 301, page miss handler (PMH) 501, memory order buffer (MOB) 503, and translation lookaside buffer (TLB) 504, as well as memory dispatch 502 and the writeback bus 308. The PMH 501 is coupled to the memory dispatch bus 502 and TLB (translation lookaside buffer) 504. MOB 503 is coupled to the reservation station, memory dispatch bus 502, writeback bus 308, the data cache memory and TLB 504. TLB 504 is also coupled to memory dispatch bus 502, writeback bus 308 and the data cache memory. Memory dispatch bus 502 and writeback bus 308 are also coupled to the data cache memory. AGU 301 is coupled to MOB 503, the writeback bus 308, and the dispatch bus 309.

The AGU 301, MOB 503, PMH 501, and TLB 504 of FIG. 5 control all load accesses to the data cache memory and, in turn, the memory 207 of the computer system. The AGU 301, MOB 503, PMH 501, and TLB 504 also execute the STA (store address) portion of the store instruction. Specifically, MOB 503 buffers the results of the STA execution for the eventual store dispatch to the data cache memory. The AGU 301 generates the appropriate linear address for the memory operations. The AGU 301 computes the linear address using a base address, a displacement value, a scale value, an index value and a segment value. The linear address is 32-bits long with a 20 higher order bits identifying a memory page and the 12 low order bits identifying the offset within the memory page. Reference to a linear address refers to a 32 bit address composed of a page reference high order portion and an offset lower order portion. Further, in one embodiment of the invention, reference to a physical address refers to a 36 bit address composed of a page address high order portion and an offset lower order portion. This address may be composed of more or less bits in alternative embodiments (such as 40 bits). The AGU 301 also contains a segment register file (SRF) that allows segment register read and segment register write operations. The pipeline of the present invention pertinent to the AGU SRF read and write operations will be described in further detail hereinafter.

TLB 504 translates the 32-bit linear address into a 36-bit physical address with 24 higher order bits indicating the memory page, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 of FIG. 5 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively. MOB 503 controls the necessary monitoring and dispatched these non-speculative operations at the connect time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions. The TLB 504 and the PMH 501 are intended to represent a broad category of these elements found in most computer systems.

PART III—THE ADDRESS GENERATION UNIT

FIG. 6 illustrates components of the AGU 301 of the present invention in further detail. The AGU 301 of the present invention performs address calculations, performs the segment operations (reading and writing to the segment register file), and controls accesses to all control and test registers. The AGU contains two independent address calculation blocks 626 and 628. Each block is capable of producing a linear address and an effective address every clock cycle, as well as checking for segment limit violations, alignment faults, and performing access time protection checks for a given instruction. It is appreciated that there are well known circuits for performing segment violation checking, alignment fault detection and performing access time protection checking. Any number of well known methods to perform the above may be implemented consistent within the scope of the present invention.

The AGU 301 also contains a segment unit 624 which contains the segment register file (SRF), performs all the segment register loads, and contains the circuitry which performs (along with TESTPLA 622) protection checks for segment register writes performed on AGU0. As will be discussed in further detail below, the SRF contains three read ports (two of which are pertinent to aspects of the present invention) and one write port. There is a control register subunit 630 which holds the control and test registers (CRs) of the unit and also controls reads and writes to such register on the processor. The control unit 630 is not particularly pertinent to aspects of the present invention.

In one embodiment, the AGU0 block 628 processes load instructions and also processes segment operations (reads and writes to the SRF) and the AGU 1 block 626 processes store address instructions only. Since the SRF contains two separate read ports and one write port, the AGU 301 of the present invention may process two instructions simultaneously, as long as both do not need to write to the SRF. In one embodiment, since the AGU1 processes store instruction only, the AGU 301 of the present invention may process simultaneously a load and a store instruction or a segment operation and a store operation may be performed simultaneously. The pipestages operable within each AGU block (626, 628) will be discussed in further detail below. It is appreciated that within an alternative embodiment of the present invention, both AGU blocks (AGU0 and AGU1) may be implemented to perform segment operations and also perform load operations. In such alternative embodiment, the SRF contains two write ports allowing two segment operations to be performed simultaneously.

The segment unit 624 sends to the AGU 1, a segment base and a segment limit value from the SRF over bus 660 and bus 661, respectively. Similarly, segment unit 624 sends AGU0 a segment base and a segment limit value from the SRF over bus 662 and 663, respectively. The above buses are utilized for returning data from a read operation of the SRF (e.g., for a segment read operation or a read of the SRF, pursuant to a load or store instruction). AGU1 sends a cancel signal and the value of the computed linear address to the MEU 300 components over bus 650 and bus 651, respectively. AGU0 sends a cancel signal and the value of its computed linear address to the MEU 300 components over bus 652 and bus 653, respectively. As shown, the control register unit 630 is coupled to the control register address and data buses 671.

Generally, if a memory operation is successful, the AGU 301 sends an address to the memory subsystem and its function is complete. If there is a fault on the operation, the AGU 301 drives fault status back to the ROB 306 and cancels the operation in the memory subsystem. If a segment operation (loading segment register data) is successful, the AGU writes status back to the ROB 306 (and to the SRF) to indicate the above. If the operation is not successful, the AGU 301 will drive out fault status for the faulting operation. In some instances, if the MOB needs to use the writeback bus, it will save the AGU's fault status and have the AGU write the status back subsequently.

As shown in FIG. 6, the AGU 301 receives from the RS 305, opcode data over bus 602 and bus 604 for two operations. Over bus 642 and bus 644 mux control lines are supplied so that the AGU may receive source data from the RS 305 (over bus 640 and bus 645) or may receive the source data from the write back bus 308 (over bus 641 and 646) for single cycle throughput. The source data from the RS 305 is then forwarded via mux 610 and mux 614 to AGU1 and AGU0, respectively. The RS 305 always sends control and opcode information to the AGU, as well as source 1 or source 2 of an instruction. If an operation in the AGU requires data from a preceding instruction executed in the IEU or from a load executed in the DCU, the data will be transferred to one of the input sources from the appropriate writeback bus 308 (or 308'). Two instructions may be dispatched to the AGU 301 of the present invention by the RS 305 within each clock cycle. The RS 305 also sends the AGU 301 a segment pointer to indicate which entries of the SRF are used by the supplied instructions and also sends a valid bit indicating if the forwarded instructions are valid. Bypassed sourced data from the writeback bus 308 (and 308') may originate from the IEU and the MEU (or FEU).

The source data received by the AGU 301 comprise a base address, scale (which is part of the instruction), index and displacement. The index is scaled and the values are added together with the segment base (read from the SRF) to form a linear address. This is performed in both the AGU0 and AGU1 blocks for up to two instructions simultaneously. Block 616 performs multi-way branch checking and contains a first portion for providing microcode pointers to procedures for handling special conditions (e.g., for far calls which go through gates). Block 616 also contains a second part for providing microcode vectors for floating point instructions. The functionality of block 616 is not particularly pertinent to the present invention. Decode and control block 612 receives the opcode (instruction) from bus 602 and 604 and, among other functions, generates a write address that will be used by the SRF unit as will be discussed further below for segment register file write operations.

Memory addressing, within the Intel architecture microprocessor, is controlled via a set of segment registers which are located in the SRF which is located in the segment unit block 624 of FIG. 6. The segment registers of the Intel architecture microprocessor are well known and will not be described in detail herein. For a further discussion of these registers, and selector and descriptor information, reference is made to the *i486 Microprocessor Programmer's Reference Manual,* from Intel Corporation, Osborne McGraw-Hill, 1990. These segment registers (e.g., CS, DS, ES, etc.) are explicitly loaded from memory via microcode instruction sequences. All memory accesses are implicitly related to the segment base addresses associated with them. There is also a limit check performed for each segment of memory and privilege or rights checks (for reading and writing) the segment registers. These are also checked for each memory reference. The above functions are performed in block 620 and 622 of FIG. 6. It is appreciated that a number of well known circuits may be used within the scope of the present invention to perform the well known limit, privilege and fault checking procedures and FIG. 6 represents one exemplary design.

PART IV—AGU SRF READ/WRITE PIPELINE

FIG. 7 illustrates the overlapping of various pipestages of the instructions in the AGU pipeline of the present invention that is implemented with the logic as shown in FIG. 6. It is appreciated that a number of different designations may be attributed to the pipestages of FIG. 7 and that the numbering of pipestages 32–35 is arbitrary. The AGU 301 operates within pipestages 33, 34 and 35 and also receives some information in an early pipestage numbered 32. Pipestage 32 occurs during the dispatch pipestage, 10(*d*), as discussed earlier (FIG. 2B) and pipestages 33, 34, and 35 occur during the execution pipestage, 10(*e*), since the AGU 301 is a functional unit of the processor 212. The following pipestages will be described in further detail below. FIG. 7 illustrates the overlapping of pipestages for four exemplary instructions. At any time, within a given clock cycle, one of the AGU units (AGU0 or AGU1) may be processing different instructions through different pipestages. FIG. 7 illustrates a processing timing chart applicable to the processing for either AGU0 or AGU1.

For instance, at clock cycle 3, uop0 is exiting the AGU0 at pipestage 35 while uop1 is at stage 34, uop 2 is at stage 33 and uop3 is entering the AGU0 at stage 32 and AGU1 may be processing separate operations. Since different pipestages may be executed simultaneously by the AGU blocks, it is advantageous to place the SRF read operation and the SRF write operation in the same pipestage. If this were allowed, then there would be no SRF resource conflicts between instructions processed by the AGU 301 because a given AGU block (626, 628) does not process a pipestage 32 of two instructions simultaneously, as shown in FIG. 7. However, in order to increase processing performance and to satisfy other demands, the AGU 301 of the present invention performs the SRF read in cycle 32 but performs the SRF write in cycle 35. As can be seen, at clock cycle 3 there is a potential resource conflict using the SRF as both uop0 and uop3 access the SRF during this cycle assuming uop0 is a segment register write. If uop0 was an SRF write operation there would be a read/write conflict.

The AGU 301 of the present invention solves this problem by performing the SRF read and SRF write operations in differing ("alternate") clock phases. Each clock cycle (1–8) of FIG. 7 comprises a high phase and a low phase of the clock signal with a transition in between. The high phase of the clock signal arrives before the low phase for any given cycle. For instance, within pipestage 35 of uop0, the SRF write is performed during the high phase of the clock cycle3 and within pipestage 32 of uop3 a read of the SRF may be performed during the low phase of the clock cycle3. By so doing, the present invention is able to avoid a resource conflict over the SRF between uop0 and uop3 during clock cycle 3 while allowing the SRF read and SRF write to occur in the two different pipestages of the two uops. Also, by having the SRF write come during the high phase, it is performed before the SRF read. Therefore, under the present invention, an SRF read operation and an SRF write operation of different pipestages of different instructions may occur during the same clock cycle without causing an SRF resource conflict.

Adopting this approach yields one inherent limitation that will be discussed below. Namely, a read operation to a given segment register must be dispatched at least three clock cycles after a write operation to the same segment register, otherwise stale data will be returned by the AGU 301 to the read operation. This can be seen by examining uop0 and uop2 of FIG. 7. Dispatch occurs during cycle 32. Assume that uop0 writes the DS register at pipestage 35 (cycle 3). Assume also that uop2 needs to read the DS register and should be executed after uop0 according to the program order. Since uop2 performs the SRF read function in pipestage 32 (cycle 2), uop2 will read the SRF a full clock cycle before uop0 writes the DS value (which is cycle 3). If this condition were allowed, uop2 would read stale (invalid) information and data coherency would not exist. However, if uop3 performed a read of DS register, then there would be no conflict since uop0 would write the DS value during the high phase of clock cycle 3, and uop3 would then read. DS during the low cycle of clock 3 and the data would be correct and coherent. Uop3 is dispatched, as shown, three clock cycles after uop0 is dispatched. The AGU 301 of the present invention does not maintain the required three cycle separation in such case. The microcode performs this function.

Generally within the AGU pipeline, the AGU 301 receives inputs from the RS 305 at pipestage 32 and latches them in pipestage 33. Before dispatch, the RS 305 sends the AGU 301 information regarding the SRF registers associated with the entries that are ready for dispatch, including those that may not be actually dispatched at pipestage 32. The AGU 301 utilizes this information to perform an early read of the SRF pertaining to those entries sent by the RS 305. Therefore, the AGU 301 may perform a number of SRF reads that are associated with invalid (e.g., nondispatched) instructions. However, the information sent from the RS 305 enables the AGU 301 to perform an early read of the SRF within the same pipestage as dispatch (pipestage 32) for these entries of the RS 305 that are dispatched. If an operation is canceled, the data read from the RS 305 is discarded by the AGU 301.

Within pipestage 33, if required for a memory operation, the linear address information is driven to the MEU and a special AGU cancel signal is driven to the MEU in pipestage 34. If necessary, during clock 33, the AGU 301 sends input data (rights, segment attributes) to the TESTPLA 622 for a segment register operation. During pipestage 35, the cache is accessed, if required. Also during pipestage 35, assuming the TESTPLA passed (or is not being used) and no fault is detected, the SRF may be written with appropriate data. All writeback data (e.g., fault information vector, etc.) is driven in pipestage 35. A segment build and a segment load are two segment register operations processed by the present invention. The segment load performs the normal operations of a load instruction but also writes the base components of the address, which represents the selector for the segment, into a specified SRF entry in pipestage 35. The segment build reads the SRF and passes a selector and a portion of the 64-bit descriptor to the TESTPLA. Assuming the TESTPLA check does not detect a fault condition, the segment build writes the selector and descriptor information into the destination segment register. The segment register operations given above are exemplary only and, within the scope of the present invention, a segment register operation is construed as any operation that updates the information of the SRF.

Refer to FIG. 8 which illustrates the pipeline of the AGU 301 of the present invention for a memory operation (e.g. a load or store instruction having a cache hit) and for a segment register write operation (lower timing diagram). During the first part of cycle 32, the RS 305 forwards information to the AGU 301 indicating which entries of the SRF will need to be read for the entries of the RS 305 that are marked as ready for dispatch, but have not yet been dispatched. The present invention AGU 301 then performs a read of the SRF for these entries at pipestage 32 during the low phase of the clock cycle. Dispatch of the entries from the RS 305 to the AGU 301 occurs during the second part of clock cycle 32 simultaneously with the SRF read operation. During dispatch, the RS 305 also sends valid bits indicating which instructions of those sent at the early part of pipestage 32 were actually dispatched so that the AGU 301 can determine which SRF read data is valid and which is not valid (up to two instructions may be dispatched to the AGU 301 per clock cycle). It is appreciated that since both AGU0 and AGU1 can process memory operations, the upper pipeline shown in FIG. 8 may be performed by AGU0 and AGU1 simultaneously and is applicable to both.

At pipestage 33 of the memory operation, the linear address and the effective address for the memory operation are computed by the present invention and a four input add function is performed based, in part, on information from the SRF read. Any of a number of well known methods may be utilized to perform this function and an exemplary method is illustrated in FIG. 11A. Referring to FIG. 8, at pipestage 34, the TLB 504 (external to the AGU 301 of the present invention) computes the physical address and the AGU 301 performs limit and rights computations and generates fault information. As stated, a number of well known methods and circuits may be implemented within the scope of the present invention for performing the fault generation, limit and fights checking. At pipestage 35, the appropriate cache memory is accessed and writeback data is driven over the writeback bus 308.

FIG. 8 also illustrates the pipeline of the present invention for a segment register operation when an SRF write is required. This may be a segment build operation or a segment load operation, or any operation that writes information to the SRF. Within the below discussions, it is appreciated that the operations of the AGU 301 of the present invention are discussed for pipestages 32–35 and are applicable as appropriate for each instruction. Similar to the memory operation pipeline (above), at the first part of pipeline 32, the RS 305 forwards the SRF entries of the instructions ready for dispatch. At the latter portion of pipestage 32, the RS 305 dispatches the segment write operation to the AGU 301 and also during the low phase of the clock cycle, the SRF is read according to the information forwarded from the RS 305. It is appreciated that the data front the SRF read operation may not be required for the given segment register operation but is performed regardless. At pipestage 33, protection checks are performed, if necessary, by the TESTPLA 622 of the present invention. The protection checks may be performed by a number of well known methods within the scope of the present invention. The TESTPLA 622 checks if the necessary conditions are present to write a segment register of the SRF. For descriptor loads, within pipestage 33 the selector and descriptor information stored in the SRF is processed, if necessary. The segment load operation uses a given segment selector to access the corresponding descriptor data. The actual function of a segment load is dependent on the current mode of the processor (e.g., protected or real). These mode differences are not particularly pertinent to aspects of the present invention and any number of well known circuits may be implemented by the present invention to perform the selector/descriptor processing for these different modes. A descriptor is stored with each segment of the SRF and is read to determine privilege level for loading the segment registers. Descriptors may be stored in descriptor tables and entries within the descriptor tables (e.g., local or global) may be referenced with selector data.

At pipestage 34 of FIG. 8 for segment build operations, the TESTPLA 622 generates write enables to the SRF depending on the outcome of the protection checks, if necessary. If the proper conditions exist allowing modification of the segment register by the segment write operation, then at pipestage 35 the SRF may be updated. During the high phase of the clock, at pipestage 35, the segment write operation is allowed to write data into the SRF. It is appreciated that according to the present invention, the SRF write is performed in an alternate clock phase compared to the SRF read. Writeback data, if present, is driven over the writeback bus at pipestage 35. It is also appreciated that within a given clock cycle, the write to the SRF will always precede a SRF read.

FIG. 9 illustrates the AGU pipeline of the present invention for a segment register write operation followed by an operation that reads the SRF data written by the write operation. Microcode maintains that any operation reading a given register of the SRF after an SRF write to that register must be dispatched at least three clock cycles after the write operation is dispatched. As shown, in the first part of clock cycle 1, the RS 305 forwards the segment entries corresponding to the ready instructions. At the latter part of clock cycle1, the segment write operation is dispatched from the RS 305 to the AGU (pipestage 32). The SRF is simultaneously read during the low phase of the clock cycle of pipestage 32 for this operation. At clock cycle2, the TESTPLA 622 performs protection checking, if required, by accessing selector and descriptor information. At cycle3, write enable signals are generated by the AGU 301 and information is written into the SRF within cycle4 (pipestage 35) during the high phase of the clock cycle4.

Also within the latter part of clock cycle4, a segment register read operation is dispatched (or any operation requiring the SRF data, such as a memory operation). The segment register read operation will read the segment register written by the segment register write operation. During the low phase of the clock cycle4, the SRF is read and therefore the read does not conflict with the write operation that also occurs during cycle4. It is appreciated that within the cycle4 the SRF write operation of the present invention occurs before the SRF read operation. It is also appreciated that according to the present invention, as long as the SRF read and write operation occur in the order as shown and within alternate phases of the clock signal, it is arbitrary whether the SRF read occurs in the high or low phase of the clock. The same is true for an SRF write operation. It is also arbitrary if the clock signal goes from high to low or low to high during a given cycle. Within the present invention, the SRF write must occur before the SRF read for a given clock cycle. The remainder of the instruction that reads the SRF is then completed in the cycles following cycle5 as shown in FIG. 9.

FIG. 10 illustrates one embodiment of the segment register file 700 of the present invention in further detail. The SRF 700 and related logic are located within the segment unit 624 of AGU 301 (FIG. 6). The SRF 700 is a static RAM having multiple entries which contain segment registers (e.g., ES, CS, SS, DS, FS, GS, GDTR, LDTR, IDTR, TR, LINSEG, and other temporary segment registers). It is appreciated that the above registers are part of the Intel architecture microprocessor and are described for exemplary purposes and that the present invention should not be construed as limited to such embodiment. The segment registers of the SRF 700 maintain the memory segmentation (management) of the memory address spaced utilized by the processor 212 of the present invention. Different space is used for different purposes (e.g., code segments, data segments, stack segments, etc.). Further, different segments are protected from certain operations. This information is maintained by the SRF 700. The SRF 700 should be construed as a buffer containing memory segmentation information regarding the addressable memory space of a microprocessor.

The SRF 700 contains two separate ports for reading data (port2 and port3) and one port (port0) for writing data. Another port is allocated for floating point information and is not pertinent to the present invention. Therefore, a read and a write operation may access the SRF at the same time. AGU1 and AGU0 may both read the SRF 700 (as also shown in FIG. 6) simultaneously and one may read the SRF 700 while the other writes to the SRF 700 within a given clock cycle.

As shown in FIG. 10, the reservation station 305 forwards the segment entries for addressing the read operation over bus 725 and over bus 730 of FIG. 10. The SRF 700 is read on each clock cycle whether the data is valid or not. Decoders 705 and 710 perform the required decoding to access the appropriate entry of the SRF 700. For addressing the write operation, the segment entry information is transmitted over bus 720 from the decode and control logic 612 (FIG. 6). Data for writing the SRF 700 is received over bus 735 from the dispatch bus. Decoder 715 decodes the write address. In the present embodiment, only AGU0 may perform SRF write operations, therefore, information over 735 may be directed by AGU0. However, as discussed above alternative embodiments of the SRF 700 may be provided having two write ports for providing additional parallelism. The data associated with the two read ports are transmitted from the SRF 700 over bus 745 to AGU0 and over bus 740 to the AGU1. Both AGU units are capable of reading the SRF 700 but only one is capable of performing segment register operations over portO. Depending on the decoding of a segment write operation, the decode and control logic 612 generates the addressing required to update the appropriate entry of the SRF 700.

It is appreciated that by allowing multiple read ports and a separate write port, the present invention allows the SRF 700 to be read in one clock cycle in one clock phase while allowing the SRF to be written in an alternate phase of the same clock cycle. Further, by allowing multiple read ports and a separate write port, for any given clock cycle, the SRF may be utilized by two instructions that require an SRF read or by an instruction requiring an SRF read and an instruction requiring an SRF write. Each AGU unit may separately process an instruction. Further, in accordance with the logic shown above, the present invention may read the SRF 700 in one pipestage of an instruction pipeline while write to the SRF 700 in another, different, pipestage of the pipeline without causing a resource conflict with the SRF 700 between pipelined instructions that are concurrently processed by the AGU 301.

According to the present invention, two reads and one write of the SRF are possible in the same clock cycle, provided that pipestage 32 of the two operations reading the SRF occurs at the same time as pipestage 35 of a third operation which writes the SRF.

FIG. 11A illustrates an exemplary data flow diagram of a memory operation within the AGU 301 of the present invention. FIG. 11A represents the processing flow for load and store instructions that are associated with a cache hit. At pipestage 32 (top) the SRF 700 is read during the low phase of the clock cycle at 1108 and a segment base is obtained. At pipestage 33, base address, index, displacement and the segment base (read from the SRF) are received and scaling, masking and addition functions are performed at block 1110, 1112, 1114 and 1116, respectively. A linear address and an effective address am generated and supplied to pipestage 34 wherein limit checking, rights checking and alignment checking are performed at 1118, 1120, and 1122, respectively. Fault generation is also performed at block 1124. Simultaneously (and external to the AGU 301 ) the TLB computes a physical address. Fault information is transmitted to the MEU. At pipestage 35 the cache is accessed and writeback data is driven, if necessary at 1128. Writeback bypass is also performed at 1126 to increase processing throughput.

FIG. 11B illustrates a data flow diagram of the AGU 301 of the present invention for a segment write operation. At pipestage 32 (top) the SRF 700 is read (1108) and at pipestage 33 the segment register entry, the base address, and index and displacement data am processed. An unscramble process 1132 is performed. Information is passed to the TESTPLA block 1134 (performed by block 622) and protection checking is performed during pipestage 33. Write enables, as shown, are generated at pipestage 34 (not shown, but between pipestages 33 and 35) by the TESTPLA 622 and information is written into the SRF 700 during the high phase of the clock signal at pipestage 35. Latch and writeback data also occur during pipestage 35.

The preferred embodiment of the present invention, a mechanism and procedure for reading and writing the SRF in alternate phases of a clock signal to eliminate SRF conflicts between instructions in a pipelined processor, is thus described. While the present invention has been described in particular embodiments, it should be appreciated that the present invention should not be construed as limited by such embodiments, but rather construed according to the below presented claims.

What is claimed is:

1. An apparatus for accessing information within a segment register file, said apparatus comprising:

a segment register file for containing information pertaining to management of a memory, said memory accessed by a processor, said memory for storing instructions and data for processing;

logic for writing to said segment register file during a first phase of a clock signal, said clock signal for referencing pipestages of said processor; and logic for reading from said segment register file during a second phase of said clock signal wherein said first phase and said second phase are alternates.

2. An apparatus for accessing information within a segment register file as described in claim 1 wherein said first phase precedes said second phase within a given cycle of said clock signal.

3. An apparatus for accessing information within a segment register file as described in claim 2 wherein said first phase is a high phase of said clock signal and wherein said second phase is a low phase of said clock signal.

4. An apparatus for accessing information within a segment register file as described in claim 1 wherein said segment register file comprises:

a first port for reading and supplying register information from said segment register file;

a second port for reading and supplying register information from said segment register file; and a third port for writing register information to said segment register file.

5. An apparatus for accessing information within a segment register file as described in claim 4 further comprising:

a first address generation unit for reading and writing said segment register file, said first address generation unit coupled to receive information from said first port of said segment register file and coupled to supply information to said third port of said segment register file; and a second address generation unit for reading said segment register file, said second address generation unit coupled to receive information from said second port of said segment register file.

6. An apparatus for accessing information within a segment register file as described in claim 1 wherein said logic for reading said segment register file is also for reading said segment register file during an instruction dispatch pipestage when an associated instruction is dispatched.

7. An apparatus for accessing information within a segment register file as described in claim 6 wherein said logic for reading said segment register file receives a segment register number in advance of said dispatch pipestage allowing said logic for reading to read said segment register file during said instruction dispatch pipestage.

8. An apparatus for accessing information within a segment register file as described in claim 6 wherein said logic for writing said segment register file is also for writing to said segment register file during an instruction pipestage following said dispatch pipestage.

9. An apparatus for accessing information within a segment register file as described in claim 1 wherein said logic for writing said segment register is operable during a first pipestage of an instruction pipeline and wherein said logic for reading said segment register file is operable during a second pipestage of said pipeline.

10. Within an address generation unit of a processor, an apparatus for accessing a segment register file, said apparatus comprising:

a clock signal for referencing pipestages of an instruction pipeline;

read logic for reading information from a segment register file during a first clock phase of a first pipestage of a first instruction;

protection logic for checking if said first instruction may update said segment register file, said protection logic operable during a second pipestage of said first instruction;

write logic for writing information into said segment register file, said information associated with said first instruction, said write logic operable during a second clock phase of a third pipestage of said first instruction; and wherein said read logic is also for reading information from said segment register file during a first clock phase of a first pipestage of a second instruction, wherein said first pipestage of said second instruction and said third pipestage of said first instruction occur concurrently.

11. An apparatus for accessing a segment register file as described in claim 10 wherein said first clock phase and said second clock phase are alternates and wherein said second clock phase precedes said first clock phase within a given clock cycle.

12. An apparatus for accessing a segment register file as described in claim 11 wherein said first clock phase is a low phase of said clock signal and said second clock phase is a high phase of said clock signal.

13. An apparatus for accessing a segment register file as described in claim 10 wherein said segment register file comprises:
   a first port for reading and supplying register information from said segment register file;
   a second port for reading and supplying register information from said segment register file; and
   a third port for writing register information to said segment register file.

14. An apparatus for accessing a segment register file as described in claim 13 further comprising:
   a first address generation unit for reading and writing said segment register file, said first address generation unit coupled to receive information from said first port of said segment register file and coupled to supply information to said third port of said segment register file; and
   a second address generation unit for reading said segment register file, said second address generation unit coupled to receive information from said second port of said segment register file.

15. An apparatus for accessing a segment register file as described in claim 10 wherein said first pipestage of said first instruction and said first pipestage of said second instruction are processor dispatch pipestages.

16. An apparatus for accessing a segment register file as described in claim 15 wherein said second instruction is dispatched a predetermined number of clock cycles after dispatch of said first instruction.

17. An apparatus for accessing a segment register file as described in claim 10 wherein said first instruction is a segment write instruction.

18. An apparatus for accessing a segment register file as described in claim 17 wherein said second instruction is a memory access instruction.

19. Within an address generation unit of a processor, an apparatus for accessing segment information, said apparatus comprising:
   a buffer means for containing segment information, said segment information for maintaining memory segments of said processor;
   a clock signal for referencing pipestages of instruction pipelines;
   read means for reading information associated with a first instruction from said buffer means during a first clock phase of said clock signal; and
   write means for writing information associated with said first instruction into said buffer means, said write means operable during a second clock phase of said clock signal, wherein said first clock phase and said second clock phase are alternates.

20. An apparatus for accessing segment information as described in claim 19 wherein said read means is also for reading information associated with a second instruction from said buffer means during a first clock phase of said clock signal wherein said write means for said first instruction and said read means for said second instruction are operable within a same clock cycle.

21. An apparatus for accessing segment information as described in claim 20 wherein said read means and said write means access said buffer means concurrently within said same clock cycle.

22. An apparatus for accessing segment information as described in claim 20 wherein said second clock phase precedes said first clock phase within a given clock cycle of said clock signal.

23. An apparatus for accessing segment information as described in claim 22 wherein said first clock phase is a low phase of said clock signal and said second clock phase is a high phase of said clock signal.

24. An apparatus for accessing segment information as described in claim 19 wherein said read means is operable within a first pipestage of a pipeline of said first instruction wherein said write means is operable within a second pipestage of said pipeline of said first instruction.

25. An apparatus for accessing segment information as described in claim 24 wherein said first instruction is a segment register write operation and wherein said second instruction is a memory operation.

26. An apparatus for accessing segment information as described in claim 19 wherein said buffer means comprises:
   a first port for reading and supplying register information from said buffer means;
   a second port for reading and supplying register information from said buffer means; and
   a third port for writing register information to said buffer means.

27. An apparatus for accessing segment information as described in claim 19 wherein said read means is also for reading said buffer means during an instruction dispatch pipestage of said first instruction and wherein said write means is also for writing to said buffer means during an instruction pipestage following said dispatch pipestage.

28. A pipelined processor for executing instructions and processing information, said processor comprising:
   a clock signal for referencing pipestages of an instruction pipeline;
   an issue unit communicatively coupled to receive instruction information and for issuing instructions;
   an execution unit for executing issued instructions and writing back result information to a register file; and
   an address generation unit for computing memory addresses associated with memory access operations and for processing segment register operations, said address generation unit comprising:
      a segment register file for containing segment information, said segment information for maintaining memory segments of said processor;
      read logic for reading information associated with a first instruction from said segment register file during a first clock phase of said clock signal; and
      write logic for writing information associated with said first instruction into said segment register file, said write logic operable during a second clock phase of said clock signal, wherein said first clock phase and said second clock phase are alternates.

29. A pipelined processor as described in claim 28 wherein said read logic is also for reading information associated with a second instruction from said segment register file during a first clock phase of said clock signal wherein said write logic for said first instruction and said read logic for said second instruction are operable within a same clock cycle.

30. A pipelined processor as described in claim 29 wherein said second clock phase precedes said first clock phase within a given clock cycle of said clock signal.

31. A pipelined processor as described in claim 30 wherein said read logic and said write logic access said segment register file concurrently within said same clock cycle.

32. A pipelined processor as described in claim 31 wherein said first clock phase is a low phase of said clock signal and said second clock phase is a high phase of said clock signal.

33. A pipelined processor as described in claim 28 wherein said read logic is operable within a first pipestage of a pipeline of said first instruction wherein said write logic is operable within a second pipestage of said pipeline of said first instruction.

34. A pipelined processor as described in claim 28 wherein said segment register file comprises:
  a first port for reading and supplying register information from said segment register file;
  a second port for reading and supplying register information from said segment register file; and
  a third port for writing register information to said segment register file.

35. A pipelined processor as described in claim 28 wherein said read logic is also for reading said segment register file during an instruction dispatch pipestage of said first instruction and wherein said write logic is also for writing to said segment register file during an instruction pipestage following said dispatch pipestage.

36. A computer system comprising:
  a system bus for providing a communication pathway;
  a memory array coupled to said system bus for providing addressable space for instructions and data, said memory array capable of segmentation;
  a user interface coupled to said bus for receiving information and transmitting information; and
  a pipelined processor coupled to said bus for executing instructions and processing data, said processor comprising an address generation unit for computing memory addresses associated with memory access operations and for processing segment register operations, said address generation unit comprising:
    a clock signal for referencing pipestages of an instruction pipeline;
    a segment register file for containing segment information, said segment information for maintaining memory segments of said memory array;
    read logic for reading information associated with a first instruction from said segment register file during a first clock phase of said clock signal; and
    write logic for writing information associated with said first instruction into said segment register file, said write logic operable during a second clock phase of said clock signal, wherein said first clock phase and said second clock phase are alternates.

37. A computer system as described in claim 36 wherein said read logic is also for reading information associated with a second instruction from said segment register file during a first clock phase of said clock signal wherein said write logic for said first instruction and said read logic for said second instruction are operable within a same clock cycle.

38. A computer system as described in claim 37 wherein said read logic and said write logic access said segment register file concurrently within said same clock cycle.

39. A computer system as described in claim 38 wherein said second clock phase precedes said first clock phase within a given clock cycle of said clock signal.

40. A computer system as described in claim 39 wherein said first clock phase is a low phase of said clock signal and said second clock phase is a high phase of said clock signal.

41. A computer system as described in claim 37 wherein said read logic is operable within a first pipestage of a pipeline of said first instruction, wherein said write logic is operable within a second pipestage of said pipeline of said first instruction and wherein said second instruction is a memory operation.

42. A computer system as described in claim 36 wherein said segment register file comprises:
  a first port for reading and supplying register information from said segment register file;
  a second port for reading and supplying register information from said segment register file; and
  a third port for writing register information to said segment register file.

43. A computer system as described in claim 36 wherein said read logic is also for reading said segment register file during an instruction dispatch pipestage of said first instruction and wherein said write logic is also for writing to said segment register file during an instruction pipestage following said dispatch pipestage.

44. In an address generation unit of a processor, a method of accessing segment information, said method comprising the steps of:
  providing a clock signal for referencing pipestages of an instruction pipeline;
  providing a segment register file for containing memory segment information;
  reading said segment register file during a first clock phase of said clock signal;
  writing said segment register file during a second clock phase of said clock signal, wherein said first clock phase and said second clock phase are alternates.

45. A method of accessing segment information as described in claim 44 wherein said second clock phase precedes said first clock phase for a given clock cycle of said clock signal.

46. A method of accessing segment information as described in claim 45 wherein said step of reading said segment register file and said step of writing said segment register file may occur concurrently within said given clock cycle.

47. A method of accessing segment information as described in claim 45 wherein said first clock phase is a low phase of said clock signal and wherein said second clock phase is a high phase of said clock signal.

48. A method of accessing segment information as described in claim 44 wherein said step of reading said segment register file provides information associated with a memory segment operation and wherein said step of writing said segment register file writes information associated with a segment register operation.

49. A method of accessing segment information as described in claim 44 wherein said step of reading said segment register file is operable during a first pipestage of a first instruction and wherein said step of writing said segment register file is operable during a second pipestage of said first instruction.

50. In an address generation unit, a method of accessing a segment register file to avoid resource conflicts, said method comprising the steps of:

(a) providing a clock signal for referencing pipestages of an instruction pipeline;

(b) reading said segment register file during a first clock phase of a first pipestage of a first instruction;

(c) performing a protection check during a second pipestage of said first instruction;

(d) writing said segment register file during a second clock phase of a third pipestage of said first instruction; and (e) reading said segment register file during a first clock phase of a first pipestage of a second instruction, wherein said first clock phase and said second clock phase are alternates and wherein said steps of (d) and (e) occur concurrently.

51. A method of accessing a segment register file as described in claim 50 wherein said second clock phase precedes said first clock phase.

52. A method of accessing a segment register file as described in claim 51 wherein said first instruction is a segment register operation and wherein said second instruction is a memory access operation.

* * * * *

UNITED STATES PATENT AND TRADEMARK OFFICE
CERTIFICATE OF CORRECTION

PATENT NO. : 5,517,657
DATED : May 14, 1996
INVENTOR(S) : Rodgers, et al

It is certified that error appears in the above-indentified patent and that said Letters Patent is hereby corrected as shown below:

In column 1, at line 19, delete "perforating" and substitute --performing--.

In column 1, at line 28, delete "modem" and substitute --modern--.

In column 1, at line 56, delete "am" and substitute --are--.

In column 3, at line 65, insert --is-- between "FIG. 5" and "an".

In column 4, at line 62, delete "home" and substitute --borne--.

In column 7, at line 11, delete "pans" and substitute --parts--.

In column 12, at line 1, delete "connect" and substitute --correct--.

In column 16, at line 14, delete "mad" and substitute --read--.

In column 16, at line 40, delete "fights" and substitute --rights--.

UNITED STATES PATENT AND TRADEMARK OFFICE
CERTIFICATE OF CORRECTION

PATENT NO. : 5,517,657                   Page 2 of 2
DATED : May 14, 1996
INVENTOR(S) : Rodgers, et al It is certified that error appears in the above-indentified patent and that said Letters Patent is hereby corrected as shown below:

In column 16, at line 58, delete "front" and substitue --from--.
In column 19, at line 16, delete "am" and substitue --are--.
In column 19, at line 30, delete "am" and substitue --are--.

Signed and Sealed this

Seventh Day of January, 1997

Attest:

BRUCE LEHMAN

Attesting Officer      Commissioner of Patents and Trademarks